United States Patent
Ismael

(10) Patent No.: US 10,528,726 B1
(45) Date of Patent: Jan. 7, 2020

(54) MICROVISOR-BASED MALWARE DETECTION APPLIANCE ARCHITECTURE

(71) Applicant: FireEye, Inc., Milpitas, CA (US)

(72) Inventor: Osman Abdoul Ismael, Palo Alto, CA (US)

(73) Assignee: FireEye, Inc., Milpitas, CA (US)

( * ) Notice: Subject to any disclaimer, the term of this patent is extended or adjusted under 35 U.S.C. 154(b) by 0 days.

(21) Appl. No.: 15/943,357

(22) Filed: Apr. 2, 2018

Related U.S. Application Data

(62) Division of application No. 14/962,497, filed on Dec. 8, 2015, now Pat. No. 9,934,376.

(60) Provisional application No. 62/097,499, filed on Dec. 29, 2014.

(51) Int. Cl.
  *G06F 21/00* (2013.01)
  *G06F 21/55* (2013.01)
  *G06F 9/455* (2018.01)

(52) U.S. Cl.
  CPC ........ *G06F 21/552* (2013.01); *G06F 9/45558* (2013.01); *G06F 2009/45587* (2013.01); *G06F 2009/45591* (2013.01); *G06F 2221/034* (2013.01)

(58) Field of Classification Search
  None
  See application file for complete search history.

(56) References Cited

U.S. PATENT DOCUMENTS

| | | |
|---|---|---|
| 4,292,580 A | 9/1981 | Ott et al. |
| 5,175,732 A | 12/1992 | Hendel et al. |
| 5,319,776 A | 6/1994 | Hile et al. |
| 5,440,723 A | 8/1995 | Arnold et al. |
| 5,490,249 A | 2/1996 | Miller |

(Continued)

FOREIGN PATENT DOCUMENTS

| | | |
|---|---|---|
| GB | 2439806 A | 1/2008 |
| GB | 2490431 A | 10/2012 |

(Continued)

OTHER PUBLICATIONS

Lacoste, Marc, "What Does the Future Hold for Hypervisor Security?", Orange Labs, 2013, p. 1-5. (Year: 2013).*

(Continued)

*Primary Examiner* — Jeffery L Williams
(74) *Attorney, Agent, or Firm* — Rutan & Tucker, LLP

(57) ABSTRACT

A threat-aware microvisor may be deployed in a malware detection appliance architecture and execute on a malware detection system (MDS) appliance to provide exploit and malware detection within a network environment. The microvisor may underlie an operating system kernel of the MDS appliance and execute in kernel space of the architecture to control access to kernel resources of the appliance for any operating system process. A type 0 virtual machine monitor may be disposed over the microvisor and execute in user space of the architecture as a pass-through module configured to expose the kernel resources of the appliance to the operating system kernel. One or more hypervisors, e.g., type 1 VMM, may be further disposed over the microvisor and execute in user space of the architecture under control of the microvisor to support execution of one or more guest operating systems inside one or more full virtual machines.

18 Claims, 6 Drawing Sheets

(56) References Cited

U.S. PATENT DOCUMENTS

| | | |
|---|---|---|
| 5,657,473 A | 8/1997 | Killean et al. |
| 5,802,277 A | 9/1998 | Cowlard |
| 5,842,002 A | 11/1998 | Schnurer et al. |
| 5,960,170 A | 9/1999 | Chen et al. |
| 5,978,917 A | 11/1999 | Chi |
| 5,983,348 A | 11/1999 | Ji |
| 6,088,803 A | 7/2000 | Tso et al. |
| 6,092,194 A | 7/2000 | Touboul |
| 6,094,677 A | 7/2000 | Capek et al. |
| 6,108,799 A | 8/2000 | Boulay et al. |
| 6,154,844 A | 11/2000 | Touboul et al. |
| 6,269,330 B1 | 7/2001 | Cidon et al. |
| 6,272,641 B1 | 8/2001 | Ji |
| 6,279,113 B1 | 8/2001 | Vaidya |
| 6,298,445 B1 | 10/2001 | Shostack et al. |
| 6,357,008 B1 | 3/2002 | Nachenberg |
| 6,424,627 B1 | 7/2002 | Sorhaug et al. |
| 6,442,696 B1 | 8/2002 | Wray et al. |
| 6,484,315 B1 | 11/2002 | Ziese |
| 6,487,666 B1 | 11/2002 | Shanklin et al. |
| 6,493,756 B1 | 12/2002 | O'Brien et al. |
| 6,550,012 B1 | 4/2003 | Villa et al. |
| 6,775,657 B1 | 8/2004 | Baker |
| 6,831,893 B1 | 12/2004 | Ben Nun et al. |
| 6,832,367 B1 | 12/2004 | Choi et al. |
| 6,895,550 B2 | 5/2005 | Kanchirayappa et al. |
| 6,898,632 B2 | 5/2005 | Gordy et al. |
| 6,907,396 B1 | 6/2005 | Muttik et al. |
| 6,941,348 B2 | 9/2005 | Petry et al. |
| 6,971,097 B1 | 11/2005 | Wallman |
| 6,981,279 B1 | 12/2005 | Arnold et al. |
| 7,007,107 B1 | 2/2006 | Ivchenko et al. |
| 7,028,179 B2 | 4/2006 | Anderson et al. |
| 7,043,757 B2 | 5/2006 | Hoefelmeyer et al. |
| 7,058,822 B2 | 6/2006 | Edery et al. |
| 7,069,316 B1 | 6/2006 | Gryaznov |
| 7,080,407 B1 | 7/2006 | Zhao et al. |
| 7,080,408 B1 | 7/2006 | Pak et al. |
| 7,093,002 B2 | 8/2006 | Wolff et al. |
| 7,093,239 B1 | 8/2006 | van der Made |
| 7,096,498 B2 | 8/2006 | Judge |
| 7,100,201 B2 | 8/2006 | Izatt |
| 7,107,617 B2 | 9/2006 | Hursey et al. |
| 7,159,149 B2 | 1/2007 | Spiegel et al. |
| 7,213,260 B2 | 5/2007 | Judge |
| 7,231,667 B2 | 6/2007 | Jordan |
| 7,240,364 B1 | 7/2007 | Branscomb et al. |
| 7,240,368 B1 | 7/2007 | Roesch et al. |
| 7,243,371 B1 | 7/2007 | Kasper et al. |
| 7,249,175 B1 | 7/2007 | Donaldson |
| 7,287,278 B2 | 10/2007 | Liang |
| 7,308,716 B2 | 12/2007 | Danford et al. |
| 7,328,453 B2 | 2/2008 | Merkle, Jr. et al. |
| 7,346,486 B2 | 3/2008 | Ivancic et al. |
| 7,356,736 B2 | 4/2008 | Natvig |
| 7,386,888 B2 | 6/2008 | Liang et al. |
| 7,392,542 B2 | 6/2008 | Bucher |
| 7,418,729 B2 | 8/2008 | Szor |
| 7,428,300 B1 | 9/2008 | Drew et al. |
| 7,441,272 B2 | 10/2008 | Durham et al. |
| 7,448,084 B1 | 11/2008 | Apap et al. |
| 7,458,098 B2 | 11/2008 | Judge et al. |
| 7,464,404 B2 | 12/2008 | Carpenter et al. |
| 7,464,407 B2 | 12/2008 | Nakae et al. |
| 7,467,408 B1 | 12/2008 | O'Toole, Jr. |
| 7,478,428 B1 | 1/2009 | Thomlinson |
| 7,480,773 B1 | 1/2009 | Reed |
| 7,487,543 B2 | 2/2009 | Arnold et al. |
| 7,496,960 B1 | 2/2009 | Chen et al. |
| 7,496,961 B2 | 2/2009 | Zimmer et al. |
| 7,519,990 B1 | 4/2009 | Xie |
| 7,523,493 B2 | 4/2009 | Liang et al. |
| 7,530,104 B1 | 5/2009 | Thrower et al. |
| 7,540,025 B2 | 5/2009 | Tzadikario |
| 7,546,638 B2 | 6/2009 | Anderson et al. |
| 7,565,550 B2 | 7/2009 | Liang et al. |
| 7,568,233 B1 | 7/2009 | Szor et al. |
| 7,584,455 B2 | 9/2009 | Ball |
| 7,603,715 B2 | 10/2009 | Costa et al. |
| 7,607,171 B1 | 10/2009 | Marsden et al. |
| 7,639,714 B2 | 12/2009 | Stolfo et al. |
| 7,644,441 B2 | 1/2010 | Schmid et al. |
| 7,657,419 B2 | 2/2010 | van der Made |
| 7,676,841 B2 | 3/2010 | Sobchuk et al. |
| 7,698,548 B2 | 4/2010 | Shelest et al. |
| 7,707,633 B2 | 4/2010 | Danford et al. |
| 7,712,136 B2 | 5/2010 | Sprosts et al. |
| 7,730,011 B1 | 6/2010 | Deninger et al. |
| 7,739,740 B1 | 6/2010 | Nachenberg et al. |
| 7,779,463 B2 | 8/2010 | Stolfo et al. |
| 7,784,097 B1 | 8/2010 | Stolfo et al. |
| 7,832,008 B1 | 11/2010 | Kraemer |
| 7,836,502 B1 | 11/2010 | Zhao et al. |
| 7,849,506 B1 | 12/2010 | Dansey et al. |
| 7,854,007 B2 | 12/2010 | Sprosts et al. |
| 7,869,073 B2 | 1/2011 | Oshima |
| 7,877,803 B2 | 1/2011 | Enstone et al. |
| 7,904,959 B2 | 3/2011 | Sidiroglou et al. |
| 7,908,660 B2 | 3/2011 | Bahl |
| 7,930,738 B1 | 4/2011 | Petersen |
| 7,937,387 B2 | 5/2011 | Frazier et al. |
| 7,937,761 B1 | 5/2011 | Bennett |
| 7,949,849 B2 | 5/2011 | Lowe et al. |
| 7,996,556 B2 | 8/2011 | Raghavan et al. |
| 7,996,836 B1 | 8/2011 | McCorkendale et al. |
| 7,996,904 B1 | 8/2011 | Chiueh et al. |
| 7,996,905 B2 | 8/2011 | Arnold et al. |
| 8,006,305 B2 | 8/2011 | Aziz |
| 8,010,667 B2 | 8/2011 | Zhang et al. |
| 8,020,206 B2 | 9/2011 | Hubbard et al. |
| 8,028,338 B1 | 9/2011 | Schneider et al. |
| 8,042,184 B1 | 10/2011 | Batenin |
| 8,045,094 B2 | 10/2011 | Teragawa |
| 8,045,458 B2 | 10/2011 | Alperovitch et al. |
| 8,069,484 B2 | 11/2011 | McMillan et al. |
| 8,087,086 B1 | 12/2011 | Lai et al. |
| 8,171,553 B2 | 5/2012 | Aziz et al. |
| 8,176,049 B2 | 5/2012 | Deninger et al. |
| 8,176,480 B1 | 5/2012 | Spertus |
| 8,201,246 B1 | 6/2012 | Wu et al. |
| 8,204,984 B1 | 6/2012 | Aziz et al. |
| 8,214,905 B1 | 7/2012 | Doukhvalov et al. |
| 8,220,055 B1 | 7/2012 | Kennedy |
| 8,225,288 B2 | 7/2012 | Miller et al. |
| 8,225,373 B2 | 7/2012 | Kraemer |
| 8,233,882 B2 | 7/2012 | Rogel |
| 8,234,640 B1 | 7/2012 | Fitzgerald et al. |
| 8,234,709 B2 | 7/2012 | Viljoen et al. |
| 8,239,944 B1 | 8/2012 | Nachenberg et al. |
| 8,260,914 B1 | 9/2012 | Ranjan |
| 8,266,091 B1 | 9/2012 | Gubin et al. |
| 8,271,978 B2 | 9/2012 | Bennett et al. |
| 8,286,251 B2 | 10/2012 | Eker et al. |
| 8,291,499 B2 | 10/2012 | Aziz et al. |
| 8,307,435 B1 | 11/2012 | Mann et al. |
| 8,307,443 B2 | 11/2012 | Wang et al. |
| 8,312,545 B2 | 11/2012 | Tuvell et al. |
| 8,321,936 B1 | 11/2012 | Green et al. |
| 8,321,941 B2 | 11/2012 | Tuvell et al. |
| 8,332,571 B1 | 12/2012 | Edwards, Sr. |
| 8,365,286 B2 | 1/2013 | Poston |
| 8,365,297 B1 | 1/2013 | Parshin et al. |
| 8,370,938 B1 | 2/2013 | Daswani et al. |
| 8,370,939 B2 | 2/2013 | Zaitsev et al. |
| 8,375,444 B2 | 2/2013 | Aziz et al. |
| 8,381,299 B2 | 2/2013 | Stolfo et al. |
| 8,402,529 B1 | 3/2013 | Green et al. |
| 8,464,340 B2 | 6/2013 | Ahn et al. |
| 8,479,174 B2 | 7/2013 | Chiriac |
| 8,479,276 B1 | 7/2013 | Vaystikh et al. |
| 8,479,286 B2 | 7/2013 | Dalcher et al. |
| 8,479,291 B1 | 7/2013 | Bodke |
| 8,479,292 B1 | 7/2013 | Linhardt |
| 8,510,827 B1 | 8/2013 | Leake et al. |

(56) References Cited

U.S. PATENT DOCUMENTS

| | | |
|---|---|---|
| 8,510,828 B1 | 8/2013 | Guo et al. |
| 8,510,842 B2 | 8/2013 | Amit et al. |
| 8,516,478 B1 | 8/2013 | Edwards et al. |
| 8,516,590 B1 | 8/2013 | Ranadive et al. |
| 8,516,593 B2 | 8/2013 | Aziz |
| 8,522,236 B2 | 8/2013 | Zimmer et al. |
| 8,522,348 B2 | 8/2013 | Chen et al. |
| 8,528,086 B1 | 9/2013 | Aziz |
| 8,533,824 B2 | 9/2013 | Hutton et al. |
| 8,539,582 B1 | 9/2013 | Aziz et al. |
| 8,549,638 B2 | 10/2013 | Aziz |
| 8,555,391 B1 | 10/2013 | Demir et al. |
| 8,561,177 B1 | 10/2013 | Aziz et al. |
| 8,566,476 B2 | 10/2013 | Shiffer et al. |
| 8,566,946 B1 | 10/2013 | Aziz et al. |
| 8,584,094 B2 | 11/2013 | Dadhia et al. |
| 8,584,234 B1 | 11/2013 | Sobel et al. |
| 8,584,239 B2 | 11/2013 | Aziz et al. |
| 8,595,834 B2 | 11/2013 | Xie et al. |
| 8,627,476 B1 | 1/2014 | Satish et al. |
| 8,635,696 B1 | 1/2014 | Aziz |
| 8,682,054 B2 | 3/2014 | Xue et al. |
| 8,682,812 B1 | 3/2014 | Ranjan |
| 8,689,333 B2 | 4/2014 | Aziz |
| 8,695,096 B1 | 4/2014 | Zhang |
| 8,713,631 B1 | 4/2014 | Pavlyushchik |
| 8,713,681 B2 | 4/2014 | Silberman et al. |
| 8,726,392 B1 | 5/2014 | McCorkendale et al. |
| 8,739,280 B2 | 5/2014 | Chess et al. |
| 8,775,715 B2 | 7/2014 | Tsirkin et al. |
| 8,776,229 B1 | 7/2014 | Aziz |
| 8,782,792 B1 | 7/2014 | Bodke |
| 8,789,172 B2 | 7/2014 | Stolfo et al. |
| 8,789,178 B2 | 7/2014 | Kejriwal et al. |
| 8,793,278 B2 | 7/2014 | Frazier et al. |
| 8,793,787 B2 | 7/2014 | Ismael et al. |
| 8,805,947 B1 | 8/2014 | Kuzkin et al. |
| 8,806,647 B1 | 8/2014 | Daswani et al. |
| 8,832,352 B2 | 9/2014 | Tsirkin et al. |
| 8,832,829 B2 | 9/2014 | Manni et al. |
| 8,839,245 B1 | 9/2014 | Khajuria et al. |
| 8,850,570 B1 | 9/2014 | Ramzan |
| 8,850,571 B2 | 9/2014 | Staniford et al. |
| 8,881,234 B2 | 11/2014 | Narasimhan et al. |
| 8,881,271 B2 | 11/2014 | Butler, II |
| 8,881,282 B1 | 11/2014 | Aziz et al. |
| 8,898,788 B1 | 11/2014 | Aziz et al. |
| 8,935,779 B2 | 1/2015 | Manni et al. |
| 8,949,257 B2 | 2/2015 | Shiffer et al. |
| 8,984,638 B1 | 3/2015 | Aziz et al. |
| 8,990,939 B2 | 3/2015 | Staniford et al. |
| 8,990,944 B1 | 3/2015 | Singh et al. |
| 8,997,219 B2 | 3/2015 | Staniford et al. |
| 9,003,402 B1 | 4/2015 | Carbone et al. |
| 9,009,822 B1 | 4/2015 | Ismael et al. |
| 9,009,823 B1 | 4/2015 | Ismael et al. |
| 9,027,135 B1 | 5/2015 | Aziz |
| 9,071,638 B1 | 6/2015 | Aziz et al. |
| 9,092,625 B1 | 7/2015 | Kashyap et al. |
| 9,104,867 B1 | 8/2015 | Thioux et al. |
| 9,106,630 B2 | 8/2015 | Frazier et al. |
| 9,106,694 B2 | 8/2015 | Aziz et al. |
| 9,118,715 B2 | 8/2015 | Staniford et al. |
| 9,159,035 B1 | 10/2015 | Ismael et al. |
| 9,171,160 B2 | 10/2015 | Vincent et al. |
| 9,176,843 B1 | 11/2015 | Ismael et al. |
| 9,189,627 B1 | 11/2015 | Islam |
| 9,195,829 B1 | 11/2015 | Goradia et al. |
| 9,197,664 B1 | 11/2015 | Aziz et al. |
| 9,218,489 B2 | 12/2015 | Mooring et al. |
| 9,223,962 B1 | 12/2015 | Kashyap et al. |
| 9,223,972 B1 | 12/2015 | Vincent et al. |
| 9,225,740 B1 | 12/2015 | Ismael et al. |
| 9,241,010 B1 | 1/2016 | Bennett et al. |
| 9,251,343 B1 | 2/2016 | Vincent et al. |
| 9,262,635 B2 | 2/2016 | Paithane et al. |
| 9,268,936 B2 | 2/2016 | Butler |
| 9,275,229 B2 | 3/2016 | LeMasters |
| 9,282,109 B1 | 3/2016 | Aziz et al. |
| 9,292,686 B2 | 3/2016 | Ismael et al. |
| 9,294,501 B2 | 3/2016 | Mesdaq et al. |
| 9,300,686 B2 | 3/2016 | Pidathala et al. |
| 9,306,960 B1 | 4/2016 | Aziz |
| 9,306,974 B1 | 4/2016 | Aziz et al. |
| 9,311,479 B1 | 4/2016 | Manni et al. |
| 9,355,247 B1 | 5/2016 | Thioux et al. |
| 9,356,944 B1 | 5/2016 | Aziz |
| 9,363,280 B1 | 6/2016 | Rivlin et al. |
| 9,367,681 B1 | 6/2016 | Ismael et al. |
| 9,398,028 B1 | 7/2016 | Karandikar et al. |
| 9,413,781 B2 | 8/2016 | Cunningham et al. |
| 9,426,071 B1 | 8/2016 | Caldejon et al. |
| 9,430,646 B1 | 8/2016 | Mushtaq et al. |
| 9,432,389 B1 | 8/2016 | Khalid et al. |
| 9,438,613 B1 | 9/2016 | Paithane et al. |
| 9,438,622 B1 | 9/2016 | Staniford et al. |
| 9,438,623 B1 | 9/2016 | Thioux et al. |
| 9,459,901 B2 | 10/2016 | Jung et al. |
| 9,467,460 B1 | 10/2016 | Otvagin et al. |
| 9,483,644 B1 | 11/2016 | Paithane et al. |
| 9,495,180 B2 | 11/2016 | Ismael |
| 9,497,213 B2 | 11/2016 | Thompson et al. |
| 9,507,935 B2 | 11/2016 | Ismael et al. |
| 9,516,057 B2 | 12/2016 | Aziz |
| 9,519,782 B2 | 12/2016 | Aziz et al. |
| 9,536,091 B2 | 1/2017 | Paithane et al. |
| 9,537,972 B1 | 1/2017 | Edwards et al. |
| 9,560,059 B1 | 1/2017 | Islam |
| 9,565,202 B1 | 2/2017 | Kindlund et al. |
| 9,591,015 B1 | 3/2017 | Amin et al. |
| 9,591,020 B1 | 3/2017 | Aziz |
| 9,594,904 B1 | 3/2017 | Jain et al. |
| 9,594,905 B1 | 3/2017 | Ismael et al. |
| 9,594,912 B1 | 3/2017 | Thioux et al. |
| 9,609,007 B1 | 3/2017 | Rivlin et al. |
| 9,626,509 B1 | 4/2017 | Khalid et al. |
| 9,628,498 B1 | 4/2017 | Aziz et al. |
| 9,628,507 B2 | 4/2017 | Haq et al. |
| 9,633,134 B2 | 4/2017 | Ross |
| 9,635,039 B1 | 4/2017 | Islam et al. |
| 9,641,546 B1 | 5/2017 | Manni et al. |
| 9,654,485 B1 | 5/2017 | Neumann |
| 9,661,009 B1 | 5/2017 | Karandikar et al. |
| 9,661,018 B1 | 5/2017 | Aziz |
| 9,674,298 B1 | 6/2017 | Edwards et al. |
| 9,680,862 B2 | 6/2017 | Ismael et al. |
| 9,690,606 B1 | 6/2017 | Ha et al. |
| 9,690,933 B1 | 6/2017 | Singh et al. |
| 9,690,935 B2 | 6/2017 | Shiffer et al. |
| 9,690,936 B1 | 6/2017 | Malik et al. |
| 9,736,179 B2 | 8/2017 | Ismael |
| 9,740,857 B2 | 8/2017 | Ismael et al. |
| 9,747,446 B1 | 8/2017 | Pidathala et al. |
| 9,756,074 B2 | 9/2017 | Aziz et al. |
| 9,773,112 B1 | 9/2017 | Rathor et al. |
| 9,781,144 B1 | 10/2017 | Otvagin et al. |
| 9,787,700 B1 | 10/2017 | Amin et al. |
| 9,787,706 B1 | 10/2017 | Otvagin et al. |
| 9,792,196 B1 | 10/2017 | Ismael et al. |
| 9,824,209 B1 | 11/2017 | Ismael et al. |
| 9,824,211 B2 | 11/2017 | Wilson |
| 9,824,216 B1 | 11/2017 | Khalid et al. |
| 9,825,976 B1 | 11/2017 | Gomez et al. |
| 9,825,989 B1 | 11/2017 | Mehra et al. |
| 9,838,408 B1 | 12/2017 | Karandikar et al. |
| 9,838,411 B1 | 12/2017 | Aziz |
| 9,838,416 B1 | 12/2017 | Aziz |
| 9,838,417 B1 | 12/2017 | Khalid et al. |
| 9,846,776 B1 | 12/2017 | Paithane et al. |
| 9,876,701 B1 | 1/2018 | Caldejon et al. |
| 9,888,016 B1 | 2/2018 | Amin |
| 9,888,019 B1 | 2/2018 | Pidathala et al. |
| 9,910,988 B1 | 3/2018 | Vincent et al. |
| 9,912,644 B2 | 3/2018 | Cunningham |

(56) References Cited

U.S. PATENT DOCUMENTS

| | | |
|---|---|---|
| 9,912,681 B1 | 3/2018 | Ismael et al. |
| 9,912,684 B1 | 3/2018 | Aziz et al. |
| 9,912,691 B2 | 3/2018 | Mesdaq et al. |
| 9,912,698 B1 | 3/2018 | Thioux et al. |
| 9,916,440 B1 | 3/2018 | Paithane et al. |
| 9,921,978 B1 | 3/2018 | Chan et al. |
| 9,934,376 B1 | 4/2018 | Ismael |
| 9,934,381 B1 | 4/2018 | Kindlund et al. |
| 9,946,568 B1 | 4/2018 | Ismael et al. |
| 9,954,890 B1 | 4/2018 | Staniford et al. |
| 9,973,531 B1 | 5/2018 | Thioux |
| 10,002,252 B2 | 6/2018 | Ismael et al. |
| 10,019,338 B1 | 7/2018 | Goradia et al. |
| 10,019,573 B2 | 7/2018 | Silberman et al. |
| 10,025,691 B1 | 7/2018 | Ismael et al. |
| 10,025,927 B1 | 7/2018 | Khalid et al. |
| 10,027,689 B1 | 7/2018 | Rathor et al. |
| 10,027,690 B2 | 7/2018 | Aziz et al. |
| 10,027,696 B1 | 7/2018 | Rivlin et al. |
| 10,033,747 B1 | 7/2018 | Paithane et al. |
| 10,033,748 B1 | 7/2018 | Cunningham et al. |
| 10,033,753 B1 | 7/2018 | Islam et al. |
| 10,033,759 B1 | 7/2018 | Kabra et al. |
| 10,050,998 B1 | 8/2018 | Singh |
| 10,068,091 B1 | 9/2018 | Aziz et al. |
| 10,075,455 B2 | 9/2018 | Zafar et al. |
| 10,083,302 B1 | 9/2018 | Paithane et al. |
| 10,084,813 B2 | 9/2018 | Eyada |
| 10,089,461 B1 | 10/2018 | Ha et al. |
| 10,097,573 B1 | 10/2018 | Aziz |
| 10,104,102 B1 | 10/2018 | Neumann |
| 10,108,446 B1 | 10/2018 | Steinberg et al. |
| 10,121,000 B1 | 11/2018 | Rivlin et al. |
| 10,122,746 B1 | 11/2018 | Manni et al. |
| 10,133,863 B2 | 11/2018 | Bu et al. |
| 10,133,866 B1 | 11/2018 | Kumar et al. |
| 10,146,810 B2 | 12/2018 | Shiffer et al. |
| 10,148,693 B2 | 12/2018 | Singh et al. |
| 10,165,000 B1 | 12/2018 | Aziz et al. |
| 10,169,585 B1 | 1/2019 | Pilipenko et al. |
| 10,176,321 B2 | 1/2019 | Abbasi et al. |
| 10,181,029 B1 | 1/2019 | Ismael et al. |
| 10,191,861 B1 | 1/2019 | Steinberg et al. |
| 10,192,052 B1 | 1/2019 | Singh et al. |
| 10,198,574 B1 | 2/2019 | Thioux et al. |
| 10,200,384 B1 | 2/2019 | Mushtaq et al. |
| 10,210,329 B1 | 2/2019 | Malik et al. |
| 10,216,927 B1 | 2/2019 | Steinberg |
| 10,218,740 B1 | 2/2019 | Mesdaq et al. |
| 10,242,185 B1 | 3/2019 | Goradia |
| 2001/0005889 A1 | 6/2001 | Albrecht |
| 2001/0047326 A1 | 11/2001 | Broadbent et al. |
| 2002/0018903 A1 | 2/2002 | Kokubo et al. |
| 2002/0038430 A1 | 3/2002 | Edwards et al. |
| 2002/0091819 A1 | 7/2002 | Melchione et al. |
| 2002/0095607 A1 | 7/2002 | Lin-Hendel |
| 2002/0116627 A1 | 8/2002 | Tarbotton et al. |
| 2002/0144156 A1 | 10/2002 | Copeland |
| 2002/0162015 A1 | 10/2002 | Tang |
| 2002/0166063 A1 | 11/2002 | Lachman et al. |
| 2002/0169952 A1 | 11/2002 | DiSanto et al. |
| 2002/0184528 A1 | 12/2002 | Shevenell et al. |
| 2002/0188887 A1 | 12/2002 | Largman et al. |
| 2002/0194490 A1 | 12/2002 | Halperin et al. |
| 2003/0021728 A1 | 1/2003 | Sharpe et al. |
| 2003/0074578 A1 | 4/2003 | Ford et al. |
| 2003/0084318 A1 | 5/2003 | Schertz |
| 2003/0101381 A1 | 5/2003 | Mateev et al. |
| 2003/0115483 A1 | 6/2003 | Liang |
| 2003/0120856 A1 | 6/2003 | Neiger et al. |
| 2003/0188190 A1 | 10/2003 | Aaron et al. |
| 2003/0191957 A1 | 10/2003 | Hypponen et al. |
| 2003/0200460 A1 | 10/2003 | Morota et al. |
| 2003/0212902 A1 | 11/2003 | van der Made |
| 2003/0229801 A1 | 12/2003 | Kouznetsov et al. |
| 2003/0237000 A1 | 12/2003 | Denton et al. |
| 2004/0003323 A1 | 1/2004 | Bennett et al. |
| 2004/0006473 A1 | 1/2004 | Mills et al. |
| 2004/0015712 A1 | 1/2004 | Szor |
| 2004/0019832 A1 | 1/2004 | Arnold et al. |
| 2004/0047356 A1 | 3/2004 | Bauer |
| 2004/0083408 A1 | 4/2004 | Spiegel et al. |
| 2004/0088581 A1 | 5/2004 | Brawn et al. |
| 2004/0093513 A1 | 5/2004 | Cantrell et al. |
| 2004/0111531 A1 | 6/2004 | Staniford et al. |
| 2004/0117478 A1 | 6/2004 | Triulzi et al. |
| 2004/0117624 A1 | 6/2004 | Brandt et al. |
| 2004/0128355 A1 | 7/2004 | Chao et al. |
| 2004/0165588 A1 | 8/2004 | Pandya |
| 2004/0236963 A1 | 11/2004 | Danford et al. |
| 2004/0243349 A1 | 12/2004 | Greifeneder et al. |
| 2004/0249911 A1 | 12/2004 | Alkhatib et al. |
| 2004/0255161 A1 | 12/2004 | Cavanaugh |
| 2004/0268147 A1 | 12/2004 | Wiederin et al. |
| 2005/0005159 A1 | 1/2005 | Oliphant |
| 2005/0021740 A1 | 1/2005 | Bar et al. |
| 2005/0033960 A1 | 2/2005 | Vialen et al. |
| 2005/0033989 A1 | 2/2005 | Poletto et al. |
| 2005/0050148 A1 | 3/2005 | Mohammadioun et al. |
| 2005/0086523 A1 | 4/2005 | Zimmer et al. |
| 2005/0091513 A1 | 4/2005 | Mitomo et al. |
| 2005/0091533 A1 | 4/2005 | Omote et al. |
| 2005/0091652 A1 | 4/2005 | Ross et al. |
| 2005/0108562 A1 | 5/2005 | Khazan et al. |
| 2005/0114663 A1 | 5/2005 | Cornell et al. |
| 2005/0125195 A1 | 6/2005 | Brendel |
| 2005/0149726 A1 | 7/2005 | Joshi et al. |
| 2005/0157662 A1 | 7/2005 | Bingham et al. |
| 2005/0183143 A1 | 8/2005 | Anderholm et al. |
| 2005/0201297 A1 | 9/2005 | Peikari |
| 2005/0210533 A1 | 9/2005 | Copeland et al. |
| 2005/0216759 A1 | 9/2005 | Rothman et al. |
| 2005/0238005 A1 | 10/2005 | Chen et al. |
| 2005/0240781 A1 | 10/2005 | Gassoway |
| 2005/0262562 A1 | 11/2005 | Gassoway |
| 2005/0265331 A1 | 12/2005 | Stolfo |
| 2005/0283839 A1 | 12/2005 | Cowburn |
| 2006/0010495 A1 | 1/2006 | Cohen et al. |
| 2006/0015416 A1 | 1/2006 | Hoffman et al. |
| 2006/0015715 A1 | 1/2006 | Anderson |
| 2006/0015747 A1 | 1/2006 | Van de Ven |
| 2006/0021029 A1 | 1/2006 | Brickell et al. |
| 2006/0021054 A1 | 1/2006 | Costa et al. |
| 2006/0031476 A1 | 2/2006 | Mathes et al. |
| 2006/0047665 A1 | 3/2006 | Neil |
| 2006/0070130 A1 | 3/2006 | Costea et al. |
| 2006/0075496 A1 | 4/2006 | Carpenter et al. |
| 2006/0095968 A1 | 5/2006 | Portolani et al. |
| 2006/0101516 A1 | 5/2006 | Sudaharan et al. |
| 2006/0101517 A1 | 5/2006 | Banzhof et al. |
| 2006/0117385 A1 | 6/2006 | Mester et al. |
| 2006/0123477 A1 | 6/2006 | Raghavan et al. |
| 2006/0130060 A1 | 6/2006 | Anderson et al. |
| 2006/0143709 A1 | 6/2006 | Brooks et al. |
| 2006/0150249 A1 | 7/2006 | Gassen et al. |
| 2006/0161983 A1 | 7/2006 | Cothrell et al. |
| 2006/0161987 A1 | 7/2006 | Levy-Yurista |
| 2006/0161989 A1 | 7/2006 | Reshef et al. |
| 2006/0164199 A1 | 7/2006 | Gilde et al. |
| 2006/0173992 A1 | 8/2006 | Weber et al. |
| 2006/0179147 A1 | 8/2006 | Tran et al. |
| 2006/0184632 A1 | 8/2006 | Marino et al. |
| 2006/0191010 A1 | 8/2006 | Benjamin |
| 2006/0221956 A1 | 10/2006 | Narayan et al. |
| 2006/0236393 A1 | 10/2006 | Kramer et al. |
| 2006/0242709 A1 | 10/2006 | Seinfeld et al. |
| 2006/0248519 A1 | 11/2006 | Jaeger et al. |
| 2006/0248528 A1 | 11/2006 | Oney et al. |
| 2006/0248582 A1 | 11/2006 | Panjwani et al. |
| 2006/0251104 A1 | 11/2006 | Koga |
| 2006/0288417 A1 | 12/2006 | Bookbinder et al. |
| 2007/0006288 A1 | 1/2007 | Mayfield et al. |
| 2007/0006313 A1 | 1/2007 | Porras et al. |
| 2007/0011174 A1 | 1/2007 | Takaragi et al. |

(56) References Cited

U.S. PATENT DOCUMENTS

| | | |
|---|---|---|
| 2007/0016951 A1 | 1/2007 | Piccard et al. |
| 2007/0019286 A1 | 1/2007 | Kikuchi |
| 2007/0033645 A1 | 2/2007 | Jones |
| 2007/0038943 A1 | 2/2007 | FitzGerald et al. |
| 2007/0064689 A1 | 3/2007 | Shin et al. |
| 2007/0074169 A1 | 3/2007 | Chess et al. |
| 2007/0094730 A1 | 4/2007 | Bhikkaji et al. |
| 2007/0101435 A1 | 5/2007 | Konanka et al. |
| 2007/0128855 A1 | 6/2007 | Cho et al. |
| 2007/0142030 A1 | 6/2007 | Sinha et al. |
| 2007/0143827 A1 | 6/2007 | Nicodemus et al. |
| 2007/0156895 A1 | 7/2007 | Vuong |
| 2007/0157180 A1 | 7/2007 | Tillmann et al. |
| 2007/0157306 A1 | 7/2007 | Elrod et al. |
| 2007/0168988 A1 | 7/2007 | Eisner et al. |
| 2007/0171824 A1 | 7/2007 | Ruello et al. |
| 2007/0174915 A1 | 7/2007 | Gribble et al. |
| 2007/0180454 A1 | 8/2007 | Fujimoto et al. |
| 2007/0192500 A1 | 8/2007 | Lum |
| 2007/0192858 A1 | 8/2007 | Lum |
| 2007/0198275 A1 | 8/2007 | Malden et al. |
| 2007/0208822 A1 | 9/2007 | Wang et al. |
| 2007/0220607 A1 | 9/2007 | Sprosts et al. |
| 2007/0240218 A1 | 10/2007 | Tuvell et al. |
| 2007/0240219 A1 | 10/2007 | Tuvell et al. |
| 2007/0240220 A1 | 10/2007 | Tuvell et al. |
| 2007/0240222 A1 | 10/2007 | Tuvell et al. |
| 2007/0250930 A1 | 10/2007 | Aziz et al. |
| 2007/0256132 A2 | 11/2007 | Oliphant |
| 2007/0271446 A1 | 11/2007 | Nakamura |
| 2007/0300227 A1 | 12/2007 | Mall et al. |
| 2008/0005782 A1 | 1/2008 | Aziz |
| 2008/0018122 A1 | 1/2008 | Zierler et al. |
| 2008/0028124 A1 | 1/2008 | Tago |
| 2008/0028463 A1 | 1/2008 | Dagon et al. |
| 2008/0040710 A1 | 2/2008 | Chiriac |
| 2008/0046781 A1 | 2/2008 | Childs et al. |
| 2008/0065854 A1 | 3/2008 | Schoenberg et al. |
| 2008/0066179 A1 | 3/2008 | Liu |
| 2008/0072326 A1 | 3/2008 | Danford et al. |
| 2008/0077793 A1 | 3/2008 | Tan et al. |
| 2008/0080518 A1 | 4/2008 | Hoeflin et al. |
| 2008/0086720 A1 | 4/2008 | Lekel |
| 2008/0098476 A1 | 4/2008 | Syversen |
| 2008/0120722 A1 | 5/2008 | Sima et al. |
| 2008/0134178 A1 | 6/2008 | Fitzgerald et al. |
| 2008/0134334 A1 | 6/2008 | Kim et al. |
| 2008/0141376 A1 | 6/2008 | Clausen et al. |
| 2008/0184367 A1 | 7/2008 | McMillan et al. |
| 2008/0184373 A1 | 7/2008 | Traut et al. |
| 2008/0189787 A1 | 8/2008 | Arnold et al. |
| 2008/0201778 A1 | 8/2008 | Guo et al. |
| 2008/0209557 A1 | 8/2008 | Herley et al. |
| 2008/0215742 A1 | 9/2008 | Goldszmidt et al. |
| 2008/0222729 A1 | 9/2008 | Chen et al. |
| 2008/0244206 A1 | 10/2008 | Heo et al. |
| 2008/0263665 A1 | 10/2008 | Ma et al. |
| 2008/0294808 A1 | 11/2008 | Mahalingam et al. |
| 2008/0295172 A1 | 11/2008 | Bohacek |
| 2008/0301810 A1 | 12/2008 | Lehane et al. |
| 2008/0307524 A1 | 12/2008 | Singh et al. |
| 2008/0313738 A1 | 12/2008 | Enderby |
| 2008/0320594 A1 | 12/2008 | Jiang |
| 2009/0003317 A1 | 1/2009 | Kasralikar et al. |
| 2009/0007100 A1 | 1/2009 | Field et al. |
| 2009/0013408 A1 | 1/2009 | Schipka |
| 2009/0031423 A1 | 1/2009 | Liu et al. |
| 2009/0036111 A1 | 2/2009 | Danford et al. |
| 2009/0037835 A1 | 2/2009 | Goldman |
| 2009/0044024 A1 | 2/2009 | Oberheide et al. |
| 2009/0044274 A1 | 2/2009 | Budko et al. |
| 2009/0064332 A1 | 3/2009 | Porras et al. |
| 2009/0077666 A1 | 3/2009 | Chen et al. |
| 2009/0083369 A1 | 3/2009 | Marmor |
| 2009/0083855 A1 | 3/2009 | Apap et al. |
| 2009/0089879 A1 | 4/2009 | Wang et al. |
| 2009/0094697 A1 | 4/2009 | Provos et al. |
| 2009/0106754 A1 | 4/2009 | Liu et al. |
| 2009/0113425 A1 | 4/2009 | Ports et al. |
| 2009/0125976 A1 | 5/2009 | Wassermann et al. |
| 2009/0126015 A1 | 5/2009 | Monastyrsky et al. |
| 2009/0126016 A1 | 5/2009 | Sobko et al. |
| 2009/0133125 A1 | 5/2009 | Choi et al. |
| 2009/0144823 A1 | 6/2009 | Lamastra et al. |
| 2009/0158430 A1 | 6/2009 | Borders |
| 2009/0172661 A1 | 7/2009 | Zimmer et al. |
| 2009/0172815 A1 | 7/2009 | Gu et al. |
| 2009/0187992 A1 | 7/2009 | Poston |
| 2009/0193293 A1 | 7/2009 | Stolfo et al. |
| 2009/0198651 A1 | 8/2009 | Shiffer et al. |
| 2009/0198670 A1 | 8/2009 | Shiffer et al. |
| 2009/0198689 A1 | 8/2009 | Frazier et al. |
| 2009/0199274 A1 | 8/2009 | Frazier et al. |
| 2009/0199296 A1 | 8/2009 | Xie et al. |
| 2009/0228233 A1 | 9/2009 | Anderson et al. |
| 2009/0241187 A1 | 9/2009 | Troyansky |
| 2009/0241190 A1 | 9/2009 | Todd et al. |
| 2009/0265692 A1 | 10/2009 | Godefroid et al. |
| 2009/0271867 A1 | 10/2009 | Zhang |
| 2009/0300415 A1 | 12/2009 | Zhang et al. |
| 2009/0300761 A1 | 12/2009 | Park et al. |
| 2009/0328185 A1 | 12/2009 | Berg et al. |
| 2009/0328221 A1 | 12/2009 | Blumfield et al. |
| 2010/0005146 A1 | 1/2010 | Drako et al. |
| 2010/0011205 A1 | 1/2010 | McKenna |
| 2010/0017546 A1 | 1/2010 | Poo et al. |
| 2010/0023810 A1 | 1/2010 | Stolfo et al. |
| 2010/0030996 A1 | 2/2010 | Butler, II |
| 2010/0031353 A1 | 2/2010 | Thomas et al. |
| 2010/0037314 A1 | 2/2010 | Perdisci et al. |
| 2010/0043073 A1 | 2/2010 | Kuwamura |
| 2010/0054278 A1 | 3/2010 | Stolfo et al. |
| 2010/0058474 A1 | 3/2010 | Hicks |
| 2010/0064044 A1 | 3/2010 | Nonoyama |
| 2010/0077481 A1 | 3/2010 | Polyakov et al. |
| 2010/0083376 A1 | 4/2010 | Pereira et al. |
| 2010/0115621 A1 | 5/2010 | Staniford et al. |
| 2010/0132038 A1 | 5/2010 | Zaitsev |
| 2010/0154056 A1 | 6/2010 | Smith et al. |
| 2010/0180344 A1 | 7/2010 | Malyshev et al. |
| 2010/0192223 A1 | 7/2010 | Ismael et al. |
| 2010/0220863 A1 | 9/2010 | Dupaquis et al. |
| 2010/0235831 A1 | 9/2010 | Dittmer |
| 2010/0251104 A1 | 9/2010 | Massand |
| 2010/0254622 A1 | 10/2010 | Kamay et al. |
| 2010/0281102 A1 | 11/2010 | Chinta et al. |
| 2010/0281541 A1 | 11/2010 | Stolfo et al. |
| 2010/0281542 A1 | 11/2010 | Stolfo et al. |
| 2010/0287260 A1 | 11/2010 | Peterson et al. |
| 2010/0299665 A1 | 11/2010 | Adams |
| 2010/0299754 A1 | 11/2010 | Amit et al. |
| 2010/0306173 A1 | 12/2010 | Frank |
| 2011/0004737 A1 | 1/2011 | Greenebaum |
| 2011/0004935 A1 | 1/2011 | Moffie et al. |
| 2011/0025504 A1 | 2/2011 | Lyon et al. |
| 2011/0041179 A1 | 2/2011 | Ståhlberg |
| 2011/0047542 A1 | 2/2011 | Dang et al. |
| 2011/0047544 A1 | 2/2011 | Yehuda et al. |
| 2011/0047594 A1 | 2/2011 | Mahaffey et al. |
| 2011/0047620 A1 | 2/2011 | Mahaffey et al. |
| 2011/0055907 A1 | 3/2011 | Narasimhan et al. |
| 2011/0078794 A1 | 3/2011 | Manni et al. |
| 2011/0093951 A1 | 4/2011 | Aziz |
| 2011/0099620 A1 | 4/2011 | Stavrou et al. |
| 2011/0099633 A1 | 4/2011 | Aziz |
| 2011/0099635 A1 | 4/2011 | Silberman et al. |
| 2011/0113231 A1 | 5/2011 | Kaminsky |
| 2011/0145918 A1 | 6/2011 | Jung et al. |
| 2011/0145920 A1 | 6/2011 | Mahaffey et al. |
| 2011/0145934 A1 | 6/2011 | Abramovici et al. |
| 2011/0153909 A1 | 6/2011 | Dong |
| 2011/0167422 A1 | 7/2011 | Eom et al. |
| 2011/0167493 A1 | 7/2011 | Song et al. |
| 2011/0167494 A1 | 7/2011 | Bowen et al. |

(56) References Cited

U.S. PATENT DOCUMENTS

| | | |
|---|---|---|
| 2011/0173213 A1 | 7/2011 | Frazier et al. |
| 2011/0173460 A1 | 7/2011 | Ito et al. |
| 2011/0219449 A1 | 9/2011 | St. Neitzel et al. |
| 2011/0219450 A1 | 9/2011 | McDougal et al. |
| 2011/0225624 A1 | 9/2011 | Sawhney et al. |
| 2011/0225655 A1 | 9/2011 | Niemela et al. |
| 2011/0247072 A1 | 10/2011 | Staniford et al. |
| 2011/0265182 A1 | 10/2011 | Peinado et al. |
| 2011/0289582 A1 | 11/2011 | Kejriwal et al. |
| 2011/0296412 A1 | 12/2011 | Banga et al. |
| 2011/0302587 A1 | 12/2011 | Nishikawa et al. |
| 2011/0307954 A1 | 12/2011 | Melnik et al. |
| 2011/0307955 A1 | 12/2011 | Kaplan et al. |
| 2011/0307956 A1 | 12/2011 | Yermakov et al. |
| 2011/0314546 A1 | 12/2011 | Aziz et al. |
| 2012/0023593 A1 | 1/2012 | Puder et al. |
| 2012/0047580 A1 | 2/2012 | Smith et al. |
| 2012/0054869 A1 | 3/2012 | Yen et al. |
| 2012/0066698 A1 | 3/2012 | Yanoo |
| 2012/0079596 A1 | 3/2012 | Thomas et al. |
| 2012/0084859 A1 | 4/2012 | Radinsky et al. |
| 2012/0096553 A1 | 4/2012 | Srivastava et al. |
| 2012/0110667 A1 | 5/2012 | Zubrilin et al. |
| 2012/0117652 A1 | 5/2012 | Manni et al. |
| 2012/0121154 A1 | 5/2012 | Xue et al. |
| 2012/0124426 A1 | 5/2012 | Maybee et al. |
| 2012/0174186 A1 | 7/2012 | Aziz et al. |
| 2012/0174196 A1 | 7/2012 | Bhogavilli et al. |
| 2012/0174218 A1 | 7/2012 | McCoy et al. |
| 2012/0198279 A1 | 8/2012 | Schroeder |
| 2012/0210423 A1 | 8/2012 | Friedrichs et al. |
| 2012/0222121 A1 | 8/2012 | Staniford et al. |
| 2012/0254995 A1 | 10/2012 | Sallam |
| 2012/0255002 A1 | 10/2012 | Sallam |
| 2012/0255015 A1 | 10/2012 | Sahita et al. |
| 2012/0255016 A1 | 10/2012 | Sallam |
| 2012/0255017 A1 | 10/2012 | Sallam |
| 2012/0255021 A1 | 10/2012 | Sallam |
| 2012/0260342 A1 | 10/2012 | Dube et al. |
| 2012/0266244 A1 | 10/2012 | Green et al. |
| 2012/0278886 A1 | 11/2012 | Luna |
| 2012/0297489 A1 | 11/2012 | Dequevy |
| 2012/0311708 A1 | 12/2012 | Agarwal et al. |
| 2012/0330801 A1 | 12/2012 | McDougal et al. |
| 2012/0331553 A1 | 12/2012 | Aziz et al. |
| 2013/0014259 A1 | 1/2013 | Gribble et al. |
| 2013/0031374 A1 | 1/2013 | Thom et al. |
| 2013/0036472 A1 | 2/2013 | Aziz |
| 2013/0047257 A1 | 2/2013 | Aziz |
| 2013/0055256 A1 | 2/2013 | Banga et al. |
| 2013/0074185 A1 | 3/2013 | McDougal et al. |
| 2013/0086684 A1 | 4/2013 | Mohler |
| 2013/0097699 A1 | 4/2013 | Balupari et al. |
| 2013/0097706 A1 | 4/2013 | Titonis et al. |
| 2013/0111587 A1 | 5/2013 | Goel et al. |
| 2013/0117852 A1 | 5/2013 | Stute |
| 2013/0117855 A1 | 5/2013 | Kim et al. |
| 2013/0139264 A1 | 5/2013 | Brinkley et al. |
| 2013/0145471 A1 | 6/2013 | Richard et al. |
| 2013/0160125 A1 | 6/2013 | Likhachev et al. |
| 2013/0160127 A1 | 6/2013 | Jeong et al. |
| 2013/0160130 A1 | 6/2013 | Mendelev et al. |
| 2013/0160131 A1 | 6/2013 | Madou et al. |
| 2013/0167236 A1 | 6/2013 | Sick |
| 2013/0174214 A1 | 7/2013 | Duncan |
| 2013/0185789 A1 | 7/2013 | Hagiwara et al. |
| 2013/0185795 A1 | 7/2013 | Winn et al. |
| 2013/0185798 A1 | 7/2013 | Saunders et al. |
| 2013/0191915 A1 | 7/2013 | Antonakakis et al. |
| 2013/0191924 A1 | 7/2013 | Tedesco et al. |
| 2013/0196649 A1 | 8/2013 | Paddon et al. |
| 2013/0227691 A1 | 8/2013 | Aziz et al. |
| 2013/0246370 A1 | 9/2013 | Bartram et al. |
| 2013/0247186 A1 | 9/2013 | LeMasters |
| 2013/0263260 A1 | 10/2013 | Mahaffey et al. |
| 2013/0282776 A1 | 10/2013 | Durrant et al. |
| 2013/0291109 A1 | 10/2013 | Staniford et al. |
| 2013/0298243 A1 | 11/2013 | Kumar et al. |
| 2013/0305006 A1 | 11/2013 | Altman et al. |
| 2013/0318038 A1 | 11/2013 | Shiffer et al. |
| 2013/0318073 A1 | 11/2013 | Shiffer et al. |
| 2013/0325791 A1 | 12/2013 | Shiffer et al. |
| 2013/0325792 A1 | 12/2013 | Shiffer et al. |
| 2013/0325871 A1 | 12/2013 | Shiffer et al. |
| 2013/0325872 A1 | 12/2013 | Shiffer et al. |
| 2013/0333033 A1 | 12/2013 | Khesin |
| 2013/0346966 A1 | 12/2013 | Natu et al. |
| 2013/0347131 A1 | 12/2013 | Mooring et al. |
| 2014/0032875 A1 | 1/2014 | Butler |
| 2014/0053260 A1 | 2/2014 | Gupta et al. |
| 2014/0053261 A1 | 2/2014 | Gupta et al. |
| 2014/0130158 A1 | 5/2014 | Wang et al. |
| 2014/0137180 A1 | 5/2014 | Lukacs et al. |
| 2014/0169762 A1 | 6/2014 | Ryu |
| 2014/0179360 A1 | 6/2014 | Jackson et al. |
| 2014/0181131 A1 | 6/2014 | Ross |
| 2014/0189687 A1 | 7/2014 | Jung et al. |
| 2014/0189866 A1 | 7/2014 | Shiffer et al. |
| 2014/0189882 A1 | 7/2014 | Jung et al. |
| 2014/0237600 A1 | 8/2014 | Silberman et al. |
| 2014/0280245 A1 | 9/2014 | Wilson |
| 2014/0283037 A1 | 9/2014 | Sikorski et al. |
| 2014/0283063 A1 | 9/2014 | Thompson et al. |
| 2014/0328204 A1 | 11/2014 | Klotsche et al. |
| 2014/0337836 A1 | 11/2014 | Ismael |
| 2014/0344926 A1 | 11/2014 | Cunningham et al. |
| 2014/0351810 A1* | 11/2014 | Pratt .......... G06F 9/45545 718/1 |
| 2014/0351935 A1 | 11/2014 | Shao et al. |
| 2014/0380473 A1 | 12/2014 | Bu et al. |
| 2014/0380474 A1 | 12/2014 | Paithane et al. |
| 2015/0007312 A1 | 1/2015 | Pidathala et al. |
| 2015/0007326 A1 | 1/2015 | Mooring et al. |
| 2015/0096022 A1 | 4/2015 | Vincent et al. |
| 2015/0096023 A1 | 4/2015 | Mesdaq et al. |
| 2015/0096024 A1 | 4/2015 | Haq et al. |
| 2015/0096025 A1 | 4/2015 | Ismael |
| 2015/0180886 A1 | 6/2015 | Staniford et al. |
| 2015/0186645 A1 | 7/2015 | Aziz et al. |
| 2015/0199513 A1 | 7/2015 | Ismael et al. |
| 2015/0199531 A1 | 7/2015 | Ismael et al. |
| 2015/0199532 A1 | 7/2015 | Ismael et al. |
| 2015/0220735 A1 | 8/2015 | Paithane et al. |
| 2015/0372980 A1 | 12/2015 | Eyada |
| 2016/0004869 A1 | 1/2016 | Ismael et al. |
| 2016/0006756 A1 | 1/2016 | Ismael et al. |
| 2016/0044000 A1 | 2/2016 | Cunningham |
| 2016/0099951 A1 | 4/2016 | Kashyap et al. |
| 2016/0127393 A1 | 5/2016 | Aziz et al. |
| 2016/0132351 A1 | 5/2016 | Kashyap et al. |
| 2016/0147556 A1* | 5/2016 | Hu .......... G06F 9/45558 718/1 |
| 2016/0191547 A1 | 6/2016 | Zafar et al. |
| 2016/0191550 A1 | 6/2016 | Ismael et al. |
| 2016/0261612 A1 | 9/2016 | Mesdaq et al. |
| 2016/0285914 A1 | 9/2016 | Singh et al. |
| 2016/0301703 A1 | 10/2016 | Aziz |
| 2016/0335110 A1 | 11/2016 | Paithane et al. |
| 2017/0083703 A1 | 3/2017 | Abbasi et al. |
| 2018/0013770 A1 | 1/2018 | Ismael |
| 2018/0048660 A1 | 2/2018 | Paithane et al. |
| 2018/0121316 A1 | 5/2018 | Ismael et al. |
| 2018/0288077 A1 | 10/2018 | Siddiqui et al. |

FOREIGN PATENT DOCUMENTS

| | | |
|---|---|---|
| WO | 0206928 A2 | 1/2002 |
| WO | 02/23805 A2 | 3/2002 |
| WO | 2007117636 A2 | 10/2007 |
| WO | 2008/041950 A2 | 4/2008 |
| WO | 2011/084431 A2 | 7/2011 |
| WO | 2011/112348 A1 | 9/2011 |
| WO | 2012/075336 A1 | 6/2012 |
| WO | 2012/135192 A2 | 10/2012 |

(56) References Cited

FOREIGN PATENT DOCUMENTS

| WO | 2012/145066 A1 | 10/2012 |
|---|---|---|
| WO | 2012/154664 A2 | 11/2012 |
| WO | 2012/177464 A1 | 12/2012 |
| WO | 2013/09122 A2 | 1/2013 |
| WO | 2013/067505 A1 | 5/2013 |
| WO | 2014/004747 A2 | 1/2014 |

OTHER PUBLICATIONS

Vladimir Getov: "Security as a Service in Smart Clouds—Opportunities and Concerns", Computer Software and Applications Conference (COMPSAC), 2012 IEEE 36th Annual, IEEE, Jul. 16, 2012 (Jul. 16, 2012).
Wahid et al., Characterising the Evolution in Scanning Activity of Suspicious Hosts, Oct. 2009, Third International Conference on Network and System Security, pp. 344-350.
Whyte, et al., "DNS-Based Detection of Scanning Works in an Enterprise Network", Proceedings of the 12th Annual Network and Distributed System Security Symposium, (Feb. 2005), 15 pages.
Williamson, Matthew M., "Throttling Viruses: Restricting Propagation to Defeat Malicious Mobile Code", ACSAC Conference, Las Vegas, NV, USA, (Dec. 2002), pp. 1-9.
Yuhei Kawakoya et al: "Memory behavior-based automatic malware unpacking in stealth debugging environment", Malicious and Unwanted Software (Malware), 2010 5th International Conference on, IEEE, Piscataway, NJ, USA, Oct. 19, 2010, pp. 39-46, XP031833827, ISBN:978-1-4244-8-9353-1.
Zhang et al., The Effects of Threading, Infection Time, and Multiple-Attacker Collaboration on Malware Propagation, Sep. 2009, IEEE 28th International Symposium on Reliable Distributed Systems, pp. 73-82.
"Mining Specification of Malicious Behavior"—Jha et al, UCSB, Sep. 2007 https://www.cs.ucsb.edu/.about.chris/research/doc/esec07.sub.—mining.pdf—.
"Network Security: NetDetector—Network Intrusion Forensic System (NIFS) Whitepaper", ("NetDetector Whitepaper"), (2003).
"When Virtual is Better Than Real", IEEEXplore Digital Library, available at, http://ieeexplore.ieee.org/xpl/articleDetails.isp?reload=true&amumbe- r=990073, (Dec. 7, 2013).
Abdullah, et al., Visualizing Network Data for Intrusion Detection, 2005 IEEE Workshop on Information Assurance and Security, pp. 100-108.
Adetoye, Adedayo , et al., "Network Intrusion Detection & Response System", ("Adetoye"), (Sep. 2003).
Apostolopoulos, George; hassapis, Constantinos; "V-eM: A cluster of Virtual Machines for Robust, Detailed, and High-Performance Network Emulation", 14th IEEE International Symposium on Modeling, Analysis, and Simulation of Computer and Telecommunication Systems, Sep. 11-14, 2006, pp. 117-126.
Aura, Tuomas, "Scanning electronic documents for personally identifiable information", Proceedings of the 5th ACM workshop on Privacy in electronic society. ACM, 2006.
Baecher, "The Nepenthes Platform: An Efficient Approach to collect Malware", Springer-verlag Berlin Heidelberg, (2006), pp. 165-184.
Bayer, et al., "Dynamic Analysis of Malicious Code", J Comput Virol, Springer-Verlag, France., (2006), pp. 67-77.
Boubalos, Chris , "extracting syslog data out of raw pcap dumps, seclists.org, Honeypots mailing list archives", available at http://seclists.org/honeypots/2003/q2/319 ("Boubalos"), (Jun. 5, 2003).
Chaudet, C. , et al., "Optimal Positioning of Active and Passive Monitoring Devices", International Conference on Emerging Networking Experiments and Technologies, Proceedings of the 2005 ACM Conference on Emerging Network Experiment and Technology, CoNEXT '05, Toulousse, France, (Oct. 2005), pp. 71-82.
Cisco "Intrusion Prevention for the Cisco ASA 5500-x Series" Data Sheet (2012).
Cohen, M.I. , "PyFlag—An advanced network forensic framework", Digital investigation 5, Elsevier, (2008), pp. S112- S120.
Costa, M. , et al., "Vigilante: End-to-End Containment of Internet Worms", SOSP '05, Association for Computing Machinery, Inc., Brighton U.K., (Oct. 23-26, 2005).
Didier Stevens, "Malicious PDF Documents Explained", Security & Privacy, IEEE, IEEE Service Center, Los Alamitos, CA, US, vol. 9, No. 1, Jan. 1, 2011, pp. 80-82, XP011329453, ISSN: 1540-7993, DOI: 10.1109/MSP.2011.14.
Distler, "Malware Analysis: An Introduction", SANS Institute InfoSec Reading Room, SANS Institute, (2007).
Dunlap, George W. , et al., "ReVirt: Enabling Intrusion Analysis through Virtual-Machine Logging and Replay", Proceeding of the 5th Symposium on Operating Systems Design and Implementation, USENIX Association, ("Dunlap"), (Dec. 9, 2002).
FireEye Malware Analysis & Exchange Network, Malware Protection System, FireEye Inc., 2010.
FireEye Malware Analysis, Modern Malware Forensics, FireEye Inc., 2010.
FireEye v.6.0 Security Target, pp. 1-35, Version 1.1, FireEye Inc., May 2011.
Goel, et al., Reconstructing System State for Intrusion Analysis, Apr. 2008 SIGOPS Operating Systems Review, vol. 42 Issue 3, pp. 21-28.
Gregg Keizer: "Microsoft's HoneyMonkeys Show Patching Windows Works", Aug. 8, 2005, XP055143386, Retrieved from the Internet: URL:http://www.informationweek.com/microsofts-honeymonkeys-show-patching-windows-works/d/d-d/1035069? [retrieved on Jun. 1, 2016].
Heng Yin et al, Panorama: Capturing System-Wide Information Flow for Malware Detection and Analysis, Research Showcase © CMU, Carnegie Mellon University, 2007.
Hiroshi Shinotsuka, Malware Authors Using New Techniques to Evade Automated Threat Analysis Systems, Oct. 26, 2012, http://www.symantec.com/connect/blogs/, pp. 1-4.
Idika et al., A-Survey-of-Malware-Detection-Techniques, Feb. 2, 2007, Department of Computer Science, Purdue University.
Isohara, Takamasa, Keisuke Takemori, and Ayumu Kubota. "Kernel-based behavior analysis for android malware detection." Computational intelligence and Security (CIS), 2011 Seventh International Conference on. IEEE, 2011.
Kaeo, Merike , "Designing Network Security", ("KAEO"), (Nov. 2003).
Kevin A Roundy et al: "Hybrid Analysis and Control of Malware", Sep. 15, 2010, Recent Advances in Intrusion Detection, Springer Berlin Heidelberg, Berlin, Heidelberg, pp. 317-338, XP019150454 ISBN:978-3-642-15511-6.
Khaled Salah et al: "Using Cloud Computing to Implement a Security Overlay Network", Security & Privacy, IEEE, IEEE Service Center, Los Alamitos, CA, US, vol. 11, No. 1, Jan. 1, 2013 (Jan. 1, 2013).
Kim, H., et al., "Autograph: Toward Automated, Distributed Worm Signature Detection", Proceedings of the 13th USENIX Security Symposium (Security 2004), San Diego, (Aug. 2004), pp. 271-286.
King, Samuel T., et al., "Operating System Support for Virtual Machines", ("King"), (2003).
Kreibich, C. , et al., "Honeycomb-Creating Intrusion Detection Signatures Using Honeypots", 2nd Workshop on Hot Topics in Networks (HotNets-11), Boston, USA, (2003).
Kristoff, J. , "Botnets, Detection and Mitigation: DNS-Based Techniques", NU Security Day, (2005), 23 pages.
Lastline Labs, The Threat of Evasive Malware, Feb. 25, 2013, Lastline Labs, pp. 1-8.
Li et al., A VMM-Based System Call Interposition Framework for Program Monitoring, Dec. 2010, IEEE 16th International Conference on Parallel and Distributed Systems, pp. 706-711.
Lindorfer, Martina, Clemens Kolbitsch, and Paolo Milani Comparetti. "Detecting environment-sensitive malware." Recent Advances in Intrusion Detection. Springer Berlin Heidelberg, 2011.
Marchette, David J., "Computer Intrusion Detection and Network Monitoring: A Statistical Viewpoint", ("Marchette"), (2001).
Moore, D. , et al., "Internet Quarantine: Requirements for Containing Self-Propagating Code", INFOCOM, vol. 3, (Mar. 30-Apr. 3, 2003), pp. 1901-1910.

(56) References Cited

OTHER PUBLICATIONS

Morales, Jose A., et al., ""Analyzing and exploiting network behaviors of malware."", Security and Privacy in Communication Networks. Springer Berlin Heidelberg, 2010. 20-34.
Mori, Detecting Unknown Computer Viruses, 2004, Springer-Verlag Berlin Heidelberg.
Natvig, Kurt, "SANDBOXII: Internet", Virus Bulletin Conference, ("Natvig"), (Sep. 2002).
NetBIOS Working Group. Protocol Standard for a NetBIOS Service on a TCP/UDP transport: Concepts and Methods. STD 19, RFC 1001, Mar. 1987.
Newsome, J., et al., "Dynamic Taint Analysis for Automatic Detection, Analysis, and Signature Generation of Exploits on Commodity Software", In Proceedings of the 12th Annual Network and Distributed System Security, Symposium (NDSS '05), (Feb. 2005).
Nojiri, D., et al., "Cooperation Response Strategies for Large Scale Attack Mitigation", DARPA Information Survivability Conference and Exposition, vol. 1, (Apr. 22-24, 2003), pp. 293-302.
Oberheide et al., CloudAV.sub.—N-Version Antivirus in the Network Cloud, 17th USENIX Security Symposium USENIX Security 'Jul. 28, 2008-Aug. 1, 2008 San Jose, CA.
Reiner Sailer, Enriquillo Valdez, Trent Jaeger, Roonald Perez, Leendert van Doorn, John Linwood Griffin, Stefan Berger., &Hype: Secure Hypervisor Appraoch to Trusted Virtualized Systems (Feb. 2, 2005) ("Sailer").
Silicon Defense, "Worm Containment in the Internal Network", (Mar. 2003), pp. 1-25.
Singh, S., et al., "Automated Worm Fingerprinting", Proceedings of the ACM/USENIX Symposium on Operating System Design and Implementation, San Francisco, California, (Dec. 2004).
Thomas H. Ptacek, and Timothy N. Newsham, "Insertion, Evasion, and Denial of Service: Eluding Network Intrusion Detection", Secure Networks, ("Ptacek"), (Jan. 1998).
Venezia, Paul, "NetDetector Captures Intrusions", InfoWorld Issue 27, ("Venezia"), (Jul. 14, 2003).
Amiri Sani, Ardalan, et al. "I/O paravirtualization at the device file boundary." ACM SIGPLAN Notices 49.4 (2014), pp. 319-332.
Bias, Randy "Micro Virtual machines", Jul. 12, 2007, retrieved on line http://web.archive.org/web/20100920064755/ http://cloudscalling.com/blog/c- loud-computing/technology/micro-virtual-machines, retrieved on Nov. 12, 2015, 2 Pages.
Bromium Corp, "Bromium vSentry, Defeat of the Unknown Attack," downloaded from http://www.bromium.com/sites/default/files/Bromium-Whitepaper-vSentr- y_2.pdf on Dec. 1, 2013, 11 pages.
Bromium Corp, "Bromium vSentry—Defeat the Unknown Attack," Oct. 10, 2013, 11 pages.
Bromium Corp, "Live Attack Visualization and Analysis, What does a Malware attack look like?" http://www.bromium.com/sites/default/files/Bromium%20LAVA%20WP_2.pdf on Dec. 1, 2013, 11 pages.
Chen, P. M. and Noble, B. D., "When Virtual is Better Than Real, Department of Electrical Engineering and Computer Science", University of Michigan ("Chen") (2001).
Common Criteria for Information Technology Security Evaluation Part 3: Security Assurance Components, Sep. 2012, Ver. 3.1 (CCMB-2012-09-003), 233 pages.
Gao, Debin, Michael K. Reiter, and Dawn Xiaodong Song. "On Gray-Box Program Tracking for Anomaly Detection." USENIX security symposium. 2004, 16 pages.
Garfinkel, Tal, and Mendel Rosenblum. "A Virtual Machine Introspection Based Architecture for Intrusion Detection." NDSS. 2003, 16 pages.
Heiser, Gernot, and Ben Leslie. "The OKL4 Microvisor: Convergence point of microkernels and hypervisors." Proceedings of the first ACM asia-pacific workshop on Workshop on systems. ACM, 2010, 5 pages.
Hofmeyr, Steven A., Stephanie Forrest, and Anil Somayaji. "Intrusion detection using sequences of system calls." Journal of computer security 6.3 (1998): 151-180.

Huang, Yih, et al. "Efficiently tracking application interactions using lightweight virtualization." Proceedings of the 1st ACM workshop on Virtual machine security. ACM, 2008, 9 pages.
Iqbal, Asif, Nayeema Sadeque, and Rafika Ida Mutia. "An overview of microkernel, hypervisor and microvisor virtualization approaches for embedded systems." Report, Department of Electrical and Information Technology, Lund University, Sweden 2110 (2009), 15 Pages.
Iqbal, et al.,—"An Overview of Microkernel, Hypervisor and Microvisor Virtualization Approaches for Embedded Systems," Department of Electrical and Information Technology, Lund University, Sweden, Aug. 26, 2013, 15 pages.
Jiang, Xuxian, Xinyuan Wang, and Dongyan Xu. "Stealthy malware detection through vmm-based out-of-the-box semantic view reconstruction." Proceedings of the 14th ACM conference on Computer and communications security. ACM, 2007, 11 pages.
Jones, Stephen T., Andrea C. Arpaci-Dusseau, and Remzi H. Arpaci-Dusseau. "Antfarm: Tracking Processes in a Virtual Machine Environment." USENIX Annual Technical Conference, General Track. 2006, 14 pages.
Kapravelos, Alexandros, et al. "Revolver: An Automated Approach to the Detection of Evasive Web-based Malware." USENIX Security Symposium. 2013, 16 pages.
King, Samuel T., and Peter M. Chen. "SubVirt: Implementing malware with virtual machines." Security and Privacy, 2006 IEEE Symposium on. IEEE, 2006, 14 Pages.
Kosoresow, Andrew P., and Steven A. Hofmeyr. "Intrusion detection via system call traces." IEEE software 14.5 (1997): 35-42.
Laureano, Marcos, Carlos Maziero, and Edgard Jamhour. "Intrusion detection in virtual machine environments." Euromicro Conference, 2004. Proceedings. 30th. IEEE, 2004, 6 pages.
Levin, Thomas E., Cynthia E. Irvine, and Thuy D. Nguyen. Least privilege in separation kernels. Naval Postgraduate School Monterey CA Dept of Computer Science, 2006 8 pages.
Nguyen, Anh M., et al. "Mavmm: Lightweight and purpose built vmm for malware analysis." Computer Security Applications Conference, 2009. ACSAC'09. Annual. IEEE, 2009, 10 pages.
PCT Notification of Transmittal of the International Search Report and the Written Opinion of the International Searching Authority, or the Declaration, International Searching Authority, International Application No. PCT/US2014/071847, dated Mar. 26, 2015, 16 pages.
PCT Notification of Transmittal of the International Search Report and the Written Opinion of the International Searching Authority, or the Declaration, International Searching Authority, International Application No. PCT/US2014/071879, dated Apr. 28, 2015.
PCT Notification of Transmittal of the International Search Report and the Written Opinion of the International Searching Authority, or the Declaration, International Searching Authority, International Application No. PCT/US2014/071923, dated Mar. 26, 2015, 13 pages.
Steinberg et al., "NOVA: A Microhypervisor-Based Secure Virtualization Architecture", (EuroSys '10), ACM, 2010, p. 209-222.
Steinberg, Udo, and Bernhard Kauer. "NOVA: a microhypervisor-based secure virtualization architecture." Proceeding of the 5th European conference on Computer systems. ACM, 2010, 14 pages.
Stumpf, Frederic, et al. "An approach to a trustworthy system architecture using virtualization." Autonomic and trusted computing. Springer Berlin Heidelberg, 2007. 191-202, 12 pages.
Sun, Kun, et al. "SecureSwitch: BIOS-Assisted Isolation and Switch between Trusted and Untrusted Commodity OSes." George Mason Feb. 26, 2013, 15 pages.
U.S. Appl. No. 14/962,497, filed Dec. 8, 2015 Non-Final Office Action dated May 4, 2017.
U.S. Appl. No. 14/962,497, filed Dec. 8, 2015 Notice of Allowance dated Nov. 21, 2017.
Wojtczuk, Rafal. "Subverting the Xen hypervisor." Black Hat USA 2008 (2008), 9 pages.
Yan, Lok Kwong, et al. "Transparent and Extensible Malware Analysis by Combining Hardware Virtualization and Software Emulation." Internet Society, 2010. Downloaded from https://www.intemersociety.org/sites/default/files/05_1.pdf, 1 page.

* cited by examiner

US 10,528,726 B1

MICROVISOR-BASED MALWARE DETECTION APPLIANCE ARCHITECTURE

RELATED APPLICATION

The present application is a divisional of U.S. patent application Ser. No. 14/962,497 filed Dec. 8, 2015, now U.S. Pat. No. 9,934,376 issued Apr. 3, 2018, which claims priority from commonly owned Provisional Patent Application No. 62/097,499, entitled Microvisor-Based Malware Detection Appliance Architecture, filed on Dec. 29, 2014, the contents of which are incorporated herein by reference.

BACKGROUND

Technical Field

The present disclosure relates to malware detection and, more specifically, to a microvisor-based malware detection architecture.

Background Information

A virtual machine monitor (VMM) or hypervisor may be a hardware or software entity configured to create and run a software implementation of a computing platform or machine, i.e., a virtual machine. The hypervisor may be implemented as a type 1 VMM executing over native hardware of the computing platform, or a type 2 VMM executing within an operating system environment of the platform. The hypervisor may be further deployed in a virtualization system that fully simulates (virtualizes) physical (hardware) resources of the computing platform. Such a full virtualization system may support execution of a plurality of operating system instances inside a plurality of virtual machines, wherein the operating system instances share the hardware resources of the platform. The hypervisor of the full virtualization system may manage such sharing by hiding the hardware resources of the computing platform from users (e.g., application programs) executing on each operating system instance and, instead, providing an abstract, virtual computing platform.

A prior implementation of a virtualization system includes a special virtual machine and a hypervisor that creates other virtual machines, each of which executes an independent instance of an operating system. Malicious code may be prevented from compromising resources of the system through the use of policy enforcement and containment analysis that isolates execution of the code within a virtual machine to block or inhibit its execution within the system (i.e., outside of the virtual machine). The policy enforcement and containment may be directed to active (often computationally intensive) analysis of operating system data streams (typically operating system version and patch specific) to detect anomalous behavior. However, malicious code may attempt to evade detection by avoiding malicious behavior when executing in a virtual machine or the malicious code may attempt to exploit a vulnerability of the virtual machine itself. Therefore, such data stream analysis may be of limited use with respect to detection of malware that exploits vulnerabilities in processes or applications (or the virtual machine) executing on systems within a network environment. Accordingly, there is a need for an enhanced exploit and malware detection system that detects anomalous behavior of malware (e.g., exploits and other malicious code threats) and collects analytical information relating to such behavior.

BRIEF DESCRIPTION OF THE DRAWINGS

The above and further advantages of the embodiments herein may be better understood by referring to the following description in conjunction with the accompanying drawings in which like reference numerals indicate identically or functionally similar elements, of which.

OVERVIEW

Figure 1:
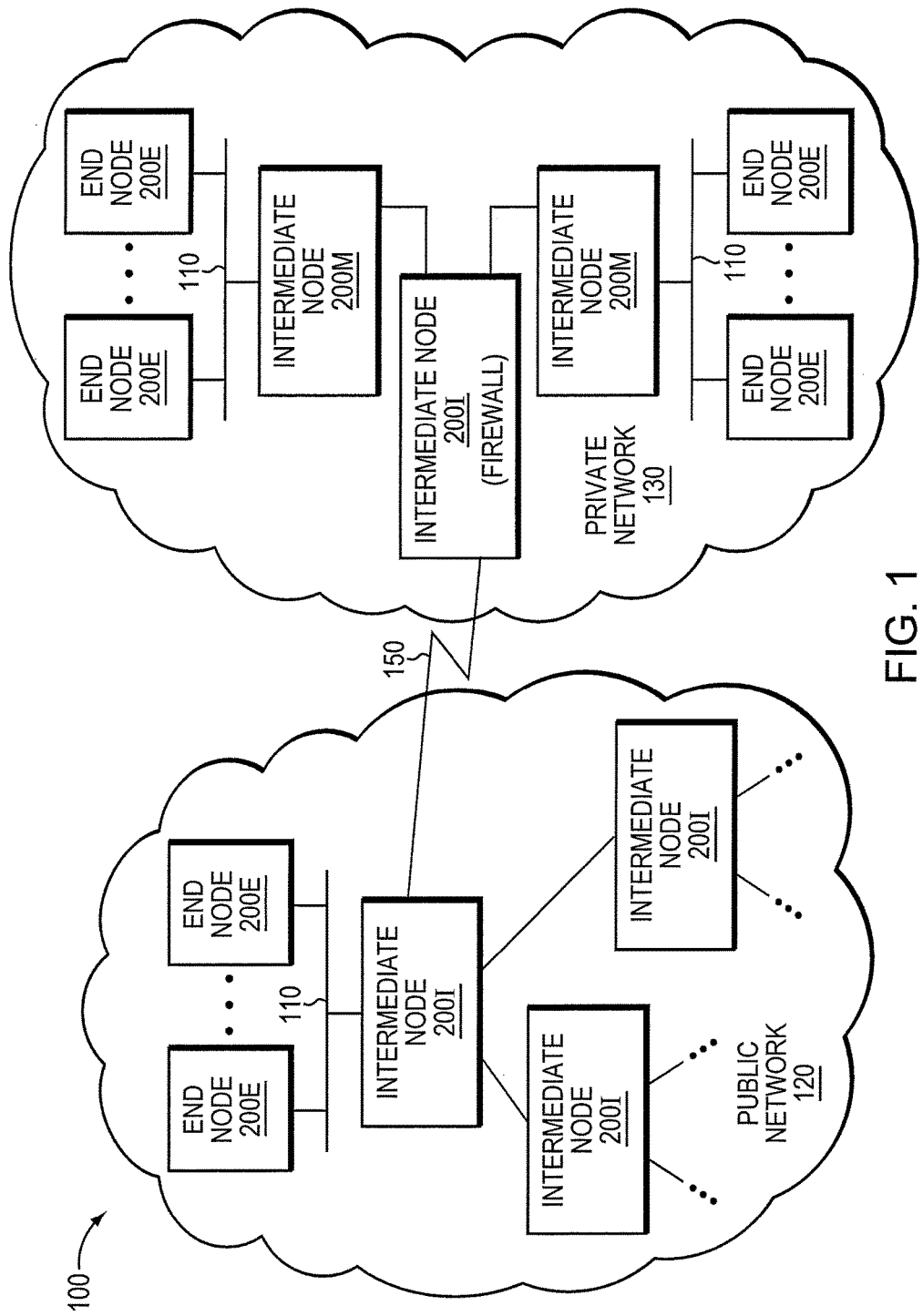
FIG. 1 is a block diagram of a network environment that may be advantageously used with one or more embodiments described herein.

The embodiments described herein provide a threat-aware microvisor deployed in a malware detection appliance architecture and executing on a malware detection system (MDS) appliance to provide exploit and malware detection within a network environment. The microvisor may underlie an operating system kernel of the MDS appliance and execute in kernel space of the architecture to control access to kernel resources of the appliance for any operating system process. A type 0 virtual machine monitor (VMM 0) may be disposed over the microvisor and operate in user space of the architecture as a pass-through module configured to expose the kernel resources of the appliance to the operating system kernel. One or more hypervisors, e.g., type 1 VMM (VMM 1), may be further disposed over the microvisor and operate in user space of the architecture under control of the microvisor to support execution of one or more guest operating systems inside one or more full virtual machines (VMs).

Exploit and malware detection on the MDS appliance may be performed in accordance with one or more software modules or engines configured to detect suspicious and/or malicious behaviors of an operating system process when, e.g., executing an object, and to correlate and classify the detected behaviors as indicative of malware. Detection of a suspicious and/or malicious object may be performed in accordance with a sequential two-phase approach, e.g., static analysis followed by dynamic analysis, of the object. Static analysis may perform examination of the object to determine whether it is suspicious and, if so, the suspicious object may be subjected to dynamic analysis, which may instrument the behavior of the object as it runs in a guest operating system. A behavioral analysis logic engine (BALE) and a classifier may thereafter cooperate to perform correlation and classification of the detected behaviors.

In an embodiment, the static analysis phase may include a static analysis engine having a heuristics engine executing as one or more user mode processes of the operating system kernel. The heuristics engine may run one or more heuristics to provide (heuristic) analysis using, e.g., rules or weighting methods to determine whether the object is suspicious. In response to a suspicious determination (or, in some embodiments, even during static analysis itself), the static analysis engine may analyze the object to, inter alia, identify software profile information associated with the guest operating system for execution in a VM, e.g., VM 1. The static analysis engine may then provide the software profile information to another user mode process embodied as a scheduler, which may coordinate with VMM 1 to spawn and schedule the VM 1 to analyze the object in accordance with the dynamic analysis phase. Dynamic analysis may include exploit and malware detection performed by the microvisor, VMM 1 and VM 1 to detect behaviors of the object. Illustratively, VMM 1 may configure VM 1 with a software profile that replicates a run-time environment that the object expects and, in some embodiments, a run-time environment of a real destination device. The behaviors of the object may be detected by instrumenting (i.e., monitoring) the object using, e.g., instrumentation logic, as the object executes in the guest operating system at VM 1, wherein the monitored run-time behaviors may be captured as dynamic analysis results by the microvisor and VMM 1.

The dynamic analysis results may be provided to the BALE, which may provide correlation information to the classifier. The BALE may be embodied as a rules-based correlation engine illustratively executing as an isolated process disposed over the microvisor. The BALE may be configured to operate on correlation rules that define, among other things, patterns (such as, e.g., sequences) of known malicious behaviors that may collectively correlate to malicious events (activity) and, in some embodiments, also patterns of known benign behaviors that may collectively correlate to benign (non-malicious) events. The dynamic analysis may collect the monitored behaviors and cooperate with the BALE to examine those behaviors, separately or collectively, as patterns to determine whether they represent malicious or benign events indicative of the presence of malware. For example, a behavior may be detected that appears benign, but when examined with other behaviors, may be indicative of malicious activity.

In an embodiment, the rules of the BALE may be correlated against the dynamic analysis results to generate correlation information pertaining to, e.g., a level of risk or a numerical score used to arrive at a decision of maliciousness. The classifier may be embodied as a classification engine executing as a user mode process of the operating system kernel and configured to use the correlation information provided by BALE to render a decision as to whether the object is malicious. Illustratively, the classifier may be configured to classify the correlation information, including monitored behaviors (expected and unexpected/anomalous) and capability violations, of the object relative to those of known malware and benign content.

In some embodiments, the MDS may be configured to perform only dynamic analysis, whose results may be provided to the BALE, which may provide correlation information to the classifier. Accordingly, in such embodiments, the initial static analysis of the objects as described herein may be avoided or significantly reduced (for example, to only identify suitable software profiles to process the objects). For example, suspicious or malicious objects (or simply "selected" objects) may be provided directly for dynamic analysis, as might be the case where additional forensic behavioral analyses of the suspicious or malicious objects are desired.

In an embodiment, the microvisor may be stored in a memory of the MDS appliance as a module of a trusted computing base (TCB) that also includes a root task module configured to cooperate with the microvisor to load one or more other modules executing on the MDS appliance. In addition, one or more of the malware detection system engines (modules) may be included in the TCB to provide a trusted malware detection environment. Illustratively, it may be desirable to organize modules associated with a decision of malware to be part of the TCB. For example, the BALE and/or classifier may be included in the TCB for the MDS appliance.

DESCRIPTION

FIG. 1 is a block diagram of a network environment 100 that may be advantageously used with one or more embodiments described herein. The network environment 100 illustratively includes a plurality of computer networks organized as a public network 120, such as the Internet, and a private network 130, such an organization or enterprise (e.g., customer) network. The networks 120, 130 illustratively include a plurality of network links and segments connected to a plurality of nodes 200. The network links and segments may include local area networks (LANs) 110 and wide area networks (WANs) 150, including wireless networks, interconnected by intermediate nodes $200_I$ to form an internetwork of nodes, wherein the intermediate nodes $200_I$ may include network switches, routers and/or one or more malware detection system (MDS) appliances (intermediate node $200_M$). As used herein, an appliance may be embodied as any type of general-purpose or special-purpose computer, including a dedicated computing device, adapted to implement a variety of software architectures relating to exploit and malware detection functionality. The term "appliance" should therefore be taken broadly to include such arrangements, in addition to any systems or subsystems configured to perform a management function for exploit and malware detection, and associated with other equipment or systems, such as a network computing device interconnecting the WANs and LANs. The LANs 110 may, in turn, interconnect end nodes $200_E$ which, in the case of private network 130, may be illustratively embodied as endpoints.

In an embodiment, the endpoints may illustratively include, e.g., client/server desktop computers, laptop/notebook computers, process controllers, medical devices, data acquisition devices, mobile devices, such as smartphones and tablet computers, and/or any other intelligent, general-purpose or special-purpose electronic device having network connectivity and, particularly for some embodiments, that may be configured to implement a virtualization system. The nodes 200 illustratively communicate by exchanging packets or messages (i.e., network traffic) according to a predefined set of protocols, such as the Transmission Control Protocol/Internet Protocol (TCP/IP); however, it should be noted that other protocols, such as the HyperText Transfer Protocol Secure (HTTPS), may be advantageously used with the embodiments herein. In the case of private network 130, the intermediate node $200_I$ may include a firewall or other network device configured to limit or block certain network traffic in an attempt to protect the endpoints from unauthorized users. Unfortunately, such conventional attempts often fail to protect the endpoints, which may be compromised.

Figure 2:
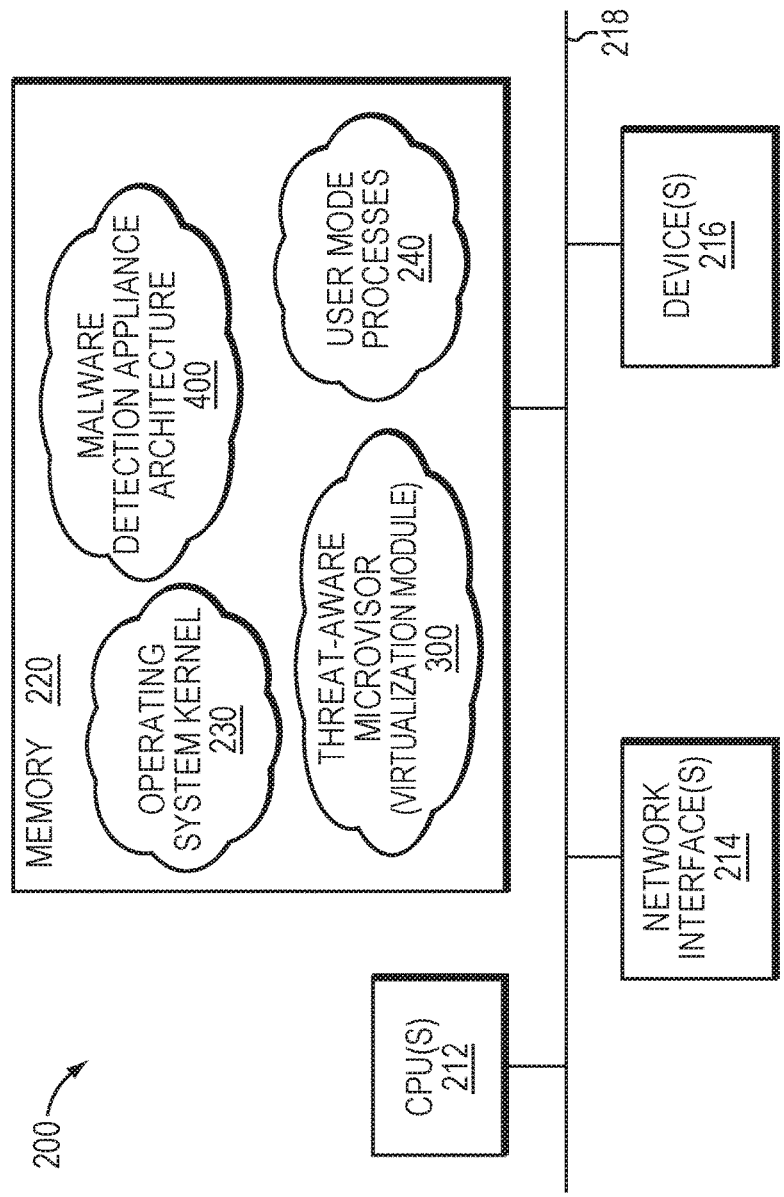
FIG. 2 is a block diagram of a node that may be advantageously used with one or more embodiments described herein.

FIG. 2 is a block diagram of a node 200, e.g., MDS appliance node $200_M$, that may be advantageously used with one or more embodiments described herein. The node 200 illustratively includes one or more central processing unit (CPUs) 212, a memory 220, one or more network interfaces 214 and one or more devices 216 connected by a system interconnect 218, such as a bus. The devices 216 may include various input/output (I/O) or peripheral devices, such as storage devices, e.g., disks. The disks may be solid state drives (SSDs) embodied as flash storage devices or other non-volatile, solid-state electronic devices (e.g., drives based on storage class memory components), although, in an embodiment, the disks may also be hard disk drives (HDDs). Each network interface 214 may include one or more network ports containing the mechanical, electrical and/or signaling circuitry needed to connect the node to the network 130 to thereby facilitate communication over the network. To that end, the network interface 214 may be configured to transmit and/or receive messages using a variety of communication protocols including, inter alia, TCP/IP and HTTPS.

In one or more embodiments where the MDS appliance $200_M$ is communicatively coupled with the network 130, the network interface 214 may operate as a data capturing device (sometimes referred to as a "tap" or "network tap") that is configured to receive incoming network (data) traffic propagating from public network 120 and into private network 130, and provide at least some of this data traffic or a duplicated copy of the traffic for malware detection. In one embodiment, the MDS appliance may be positioned (deployed) behind the firewall at an ingress point into the private network 130, and at least partially in-line with network devices (e.g., endpoints) so as to subject the incoming traffic to analysis (e.g., through static analysis) and potentially block that traffic which is classified as malware from reaching its destination (e.g., the endpoints). In another embodiment, the static analysis may be at least partially performed by the firewall or other intermediate device, or performed by the network interface 214 (e.g., by CPU 212 and/or a digital signal processor on a network interface card).

The memory 220 may include a plurality of locations that are addressable by the CPU(s) 212 and the network interface(s) 214 for storing software program code (including application programs) and data structures associated with the embodiments described herein. The CPU 212 may include processing elements or logic adapted to execute the software program code, such as threat-aware microvisor 300 and modules of malware detection appliance architecture 400, and manipulate the data structures. Exemplary CPUs may include families of instruction set architectures based on the x86 CPU from Intel Corporation of Santa Clara, Calif. and the x64 CPU from Advanced Micro Devices of Sunnyvale, Calif.

An operating system kernel 230, portions of which are typically resident in memory 220 and executed by the CPU, functionally organizes the node by, inter alia, invoking operations in support of the software program code and application programs executing on the node. A suitable operating system kernel 230 may include the Windows® series of operating systems from Microsoft Corp of Redmond, Wash., the MAC OS® and IOS® series of operating systems from Apple Inc. of Cupertino, Calif., the Linux operating system and versions of the Android™ operating system from Google, Inc. of Mountain View, Calif., among others. Suitable application programs may include Adobe Reader® from Adobe Systems Inc. of San Jose, Calif. and Microsoft Word from Microsoft Corp of Redmond, Wash. Illustratively, the software program code may be implemented as user mode processes 240 of the kernel 230. As used herein, a process (e.g., a user mode process) is an instance of software program code (e.g., an application program) executing in the operating system that may be separated (decomposed) into one or more threads, wherein each thread is a sequence of execution within the process.

It will be apparent to those skilled in the art that other types of processing elements and memory, including various computer-readable media, may be used to store and execute program instructions pertaining to the embodiments described herein. Also, while the embodiments herein are described in terms of software program code, processes, and computer, e.g., application, programs stored in memory, alternative embodiments also include the code, processes and programs being embodied as engines and/or modules consisting of hardware, software, firmware, or combinations thereof.

I. Threat-Aware Microvisor

Figure 3:
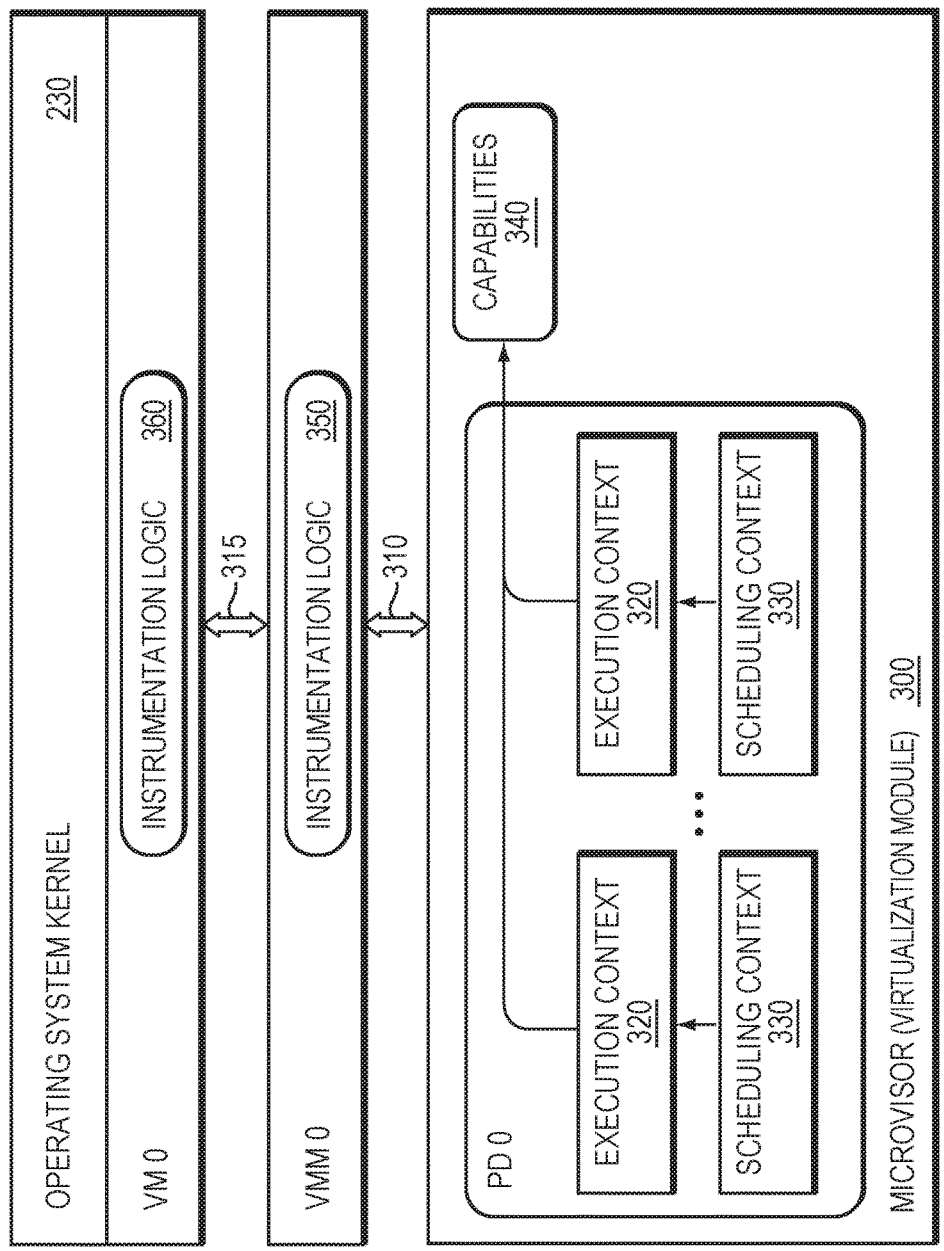
FIG. 3 is a block diagram of the threat-aware microvisor that may be advantageously used with one or more embodiments described herein.

FIG. 3 is a block diagram of the threat-aware microvisor 300 that may be advantageously used with one or more embodiments described herein. The threat-aware microvisor (hereinafter "microvisor") may be configured to facilitate run-time security analysis, including exploit and malware detection and threat intelligence, of operating system processes executing on the node 200. To that end, the microvisor may be embodied as a light-weight module disposed or layered beneath (underlying, i.e., directly on native hardware) the operating system kernel 230 of the node to thereby virtualize the hardware and control privileges (i.e., access control permissions) to kernel (e.g., hardware) resources of the node 200 that are typically controlled by the operating system kernel. Illustratively, the kernel resources may include (physical) CPU(s) 212, memory 220, network interface(s) 214, and devices 216. The microvisor 300 may be configured to control access to one or more of the resources in response to a request by an operating system process to access the resource.

As a light-weight module, the microvisor 300 may provide a virtualization layer having less functionality than a typical hypervisor. Therefore, as used herein, the microvisor 300 is a module (component) that underlies the operating system kernel 230 and includes the functionality of a microkernel (e.g., protection domains, execution contexts, capabilities and scheduling), as well as a subset of the functionality of a hypervisor (e.g., hyper-calls to implement a virtual machine monitor). Accordingly, the microvisor may cooperate with a unique virtual machine monitor (VMM), i.e., a type 0 VMM, to provide additional virtualization functionality in an operationally and resource efficient manner. Unlike a type 1 or type 2 VMM (hypervisor), the type 0 VMM (VMM 0) does not fully virtualize the kernel (hardware) resources of the node and supports execution of only one entire operating system/instance inside one virtual machine, i.e., VM 0. VMM 0 may thus instantiate VM 0 as a container for the operating system kernel 230 and its kernel resources. In an embodiment, VMM 0 may instantiate VM 0 as a module having instrumentation logic 360 directed to determination of an exploit or malware in any suspicious operating system process (kernel or user mode).

As used herein, an exploit may be construed as information (e.g., executable code, data, one or more commands provided by a user or attacker) that attempts to take advantage of a computer program or system vulnerability, often employing or constituting malware. Typically, a vulnerability may be a coding error or artifact of a computer program that allows an attacker to alter legitimate control flow during processing of the computer program by an electronic device and, thus, causes the electronic device to experience undesirable or unexpected behaviors. The undesired or unexpected behaviors may include a communication-based or execution-based anomaly which, for example, could (1) alter the functionality of the electronic device executing application software in a malicious manner; (2) alter the functionality of the electronic device executing the application software without any malicious intent; and/or (3) provide unwanted functionality which may be generally acceptable in another context. To illustrate, a computer program may be considered a state machine where all valid states (and transitions between states) are managed and defined by the program, in which case an exploit may be viewed as seeking to alter one or more of the states (or transitions) from those defined by the program. Malware may be construed as computer code that is executed to harm or co-opt operation of an electronic device or misappropriate, modify or delete data. Conventionally, malware may often be designed with malicious intent, and may be used to facilitate an exploit. For convenience, the term "malware" may be used herein to describe a malicious attack, and encompass both malicious code and exploits detectable in accordance with the disclosure herein.

Illustratively, VMM 0 is a pass-through module configured to expose the kernel resources of the node (as controlled by microvisor 300) to the operating system kernel 230. VMM 0 may also expose resources such as virtual CPUs (threads), wherein there is one-to-one mapping between the number of physical CPUs and the number of virtual CPUs that VMM 0 exposes to the operating system kernel 230. To that end, VMM 0 may enable communication between the operating system kernel (i.e., VM 0) and the microvisor over privileged interfaces 315 and 310. The VMM 0 may include software program code (e.g., executable machine code) in the form of instrumentation logic 350 (including decision logic) configured to analyze one or more interception points originated by one or more operating system processes to invoke the services, e.g., accesses to the kernel resources, of the operating system kernel 230. As used herein, an interception point is a point in an instruction stream where control passes to (e.g., is intercepted by) either the microvisor, VMM 0 or another virtual machine. A system call provides an interception point at which a switch in privilege levels occurs in the operating system, i.e., from a privilege level of the user mode process to a privilege level of the operating system kernel. VMM 0 may intercept the system call and examine a state of the process issuing (sending) the call to determine whether the call is suspicious. Illustratively, VMM 0 may contain computer executable instructions executed by the CPU 212 to perform operations that initialize and implement the instrumentation logic 350, as well as operations that spawn, configure, and control/implement VM 0 and its instrumentation logic 360. Example threat-aware microvisor and VMM 0 are described in U.S. patent application Ser. No. 14/229,580 titled Exploit Detection System with Threat-Aware Microvisor by Ismael et al., filed Mar. 28, 2014, which application is hereby incorporated by reference.

In an embodiment, the microvisor 300 may be organized to include a protection domain illustratively bound to VM 0. As used herein, a protection domain is a container for various data structures, such as execution contexts, scheduling contexts, and capabilities associated with the kernel resources accessible by an operating system process. Illustratively, the protection domain may function at a granularity of an operating system process (e.g., a user mode process 240) and, thus, is a representation of the process. Accordingly, the microvisor may provide a protection domain for the process and its run-time threads executing in the operating system. A main protection domain (PD 0) of the microvisor controls all of the kernel resources available to the operating system kernel 230 (and, hence, the user mode process 240) of VM 0 via VMM 0 and, to that end, may be associated with the services provided to the user mode process by the kernel 230.

An execution context 320 is illustratively a representation of a thread (associated with an operating system process) and, to that end, defines a state of the thread for execution on CPU 212. In an embodiment, the execution context may include inter alia (i) contents of CPU registers, (ii) pointers/values on a stack, (iii) a program counter, and/or (iv) allocation of memory via, e.g., memory pages. The execution context 320 is thus a static view of the state of thread and, therefore, its associated process. Accordingly, the thread executes within the protection domain associated with the operating system process of which the thread is a part. For the thread to execute on a CPU 212 (e.g., as a virtual CPU), its execution context 320 is tightly linked to a scheduling context 330, which may be configured to provide information for scheduling the execution context 320 for execution on the CPU 212. Illustratively, the scheduling context information may include a priority and a quantum time for execution of its linked execution context on CPU 212.

In an embodiment, the capabilities 340 may be organized as a set of access control permissions to the kernel resources to which the thread may request access. Each time the execution context 320 of a thread requests access to a kernel resource, the capabilities 340 are examined. There is illustratively one set of capabilities 340 for each protection domain, such that access to kernel resources by each execution context 320 (i.e., each thread of an execution context) of a protection domain may be defined by the set of capabilities 340. For example, physical addresses of pages of memory 220 (resulting from mappings of virtual addresses to physical addresses) may have associated access permissions (e.g., read, write, read-write) within the protection domain. To enable an execution context 320 to access a kernel resource, such as a memory page, the physical address of the page may have an associated capability 340 (access permission) that defines how the execution context 320 may reference that page. Illustratively, the capabilities may be examined by hardware (e.g., a hardware page fault upon a memory access violation) or by program code. A violation of a capability in a protection domain may be an interception point, which returns control to the VM (e.g., VM 0) bound to the protection domain.

Assume a user mode process 240 has one or more threads that run on one or more CPUs 212. Each thread has an associated execution context 320 that defines its state. When executing on a CPU 212, the thread may attempt to access a resource (a memory page). VMM 0 may instruct the microvisor 300 to configure the access permission to the memory page according to a definition of the capability within the protection domain bound to the process executing the thread. Assume further that the capability specifies that a protection domain (e.g., PD 0) can have only read-only access to the memory page. If the CPU 212 attempts to write to that memory, i.e., a write access, a trap (e.g., an exception, such as a page fault or general protection fault) may be generated by the CPU and the microvisor 300 may report the trap (via an exception handler) to VMM 0. VMM 0 may decide that such write access should be allowed and instructs the microvisor to allow the access. Alternatively, VMM 0 may decide that such write access warrants further analysis using a different set of capabilities to further monitor the process 240.

In an embodiment, the different set of capabilities may pertain to certain kernel resources, such as memory regions (as opposed to memory pages of the regions). Here, the capabilities may not be configured to define access permissions at the granularity of memory pages (e.g., 4K bytes) because of the substantial memory resources (i.e., page table entries) needed to accommodate sufficient pages to cover large memory regions. As such, in an embodiment, a region of memory (i.e., having a plurality of memory pages) may be associated with certain permissions (read-only, write-only) as defined by the capabilities, wherein the memory region may be "fine-grained" (e.g., enlarged or shrunk) to enable read or write only permissions to memory pages within the region. Accordingly, the capabilities may provide one or more variable granularity memory regions for each protection domain, wherein a least granularity is a memory page (e.g., 4 Kbytes).

In an embodiment, the microvisor 300 may be configured to perform scheduling of execution contexts 320 and verification of operational requests by the execution contexts with respect to capabilities 340. If there is a violation of the capabilities for a protection domain, a trap (e.g., an exception, such as a page fault or general protection fault) may be generated by the CPU (or other hardware) and serviced by an exception handler of the microvisor. For example, if a process 240 attempts to access a resource to which the capability specifies it does not have permission, the CPU may generate the trap and the exception handler may report the violation to, e.g., VMM 0 for analysis. In addition, the microvisor may provide VMM 0 with state information associated with the execution context 320 executing at the time of the trap. The capability violation may trigger invocation of the instrumentation logic 350 of VMM 0 to determine whether the process is suspicious or even an exploit and, if so, an appropriate course of action. Depending on the seriousness of the violation (e.g., a degree of suspicion of an exploit), VMM 0 may decide to, e.g., change a register value or issue a capability change. VMM 0 may then provide instructions to the microvisor (PD 0) as to a course of action.

For instance, assume the capability violation arises from an attempt by the process 240 to execute program instructions on a memory page not permitted to execute such instructions (e.g., a page table entry associated with the memory page configured with a no-execute bit). As a result, a page fault exception may occur that triggers invocation of the instrumentation logic 350, which may apply heuristics to determine whether the memory page likely contains an exploit as opposed to benign program instructions, e.g., just-in-time (JIT) compiler program instructions. That is, the instrumentation logic may apply the heuristics to rule out (eliminate) the likelihood that the capability violation (i.e., page fault exception) is caused by benign program instructions. Illustratively, the heuristics perform static analysis of the memory page to determine whether the capability violation is consistent with JIT compiler generated program instructions. To that end, the heuristics may determine whether the memory page is allocated by the process 240 and whether the contents of the memory page contain well-known program instruction sequences and headers, e.g., industry standard prefix and postfix generated instruction sequences and vendor identifying headers. In contrast, exploits (i.e., malware) may contain non-standard program instruction sequences and unusual headers. As a result, the heuristics may determine that a threshold of confidence (i.e., suspicion of an exploit) is exceeded when it is statistically likely the memory page contains an exploit.

In another instance, the instrumentation logic 350 may apply the heuristics to detect a sequence of capability violations that indicates the presence of an exploit (or malware). Assume a first capability violation arises from an attempt by the process 240 to write program instructions on a memory (code) page without write permission (e.g., a page table entry associated with the memory page configured with a read-only bit or no write bit and an execute bit). Assume also that a second capability violation arises from an attempt by the process to execute those program instructions on the code page. In response to the first capability violation, a first page fault exception occurs that triggers invocation of the instrumentation logic 350, which may apply heuristics that note (i.e., record) the attempted write to the code page. In response to the second capability violation, a second page fault exception may occur that again triggers invocation of the instrumentation logic, which applies the heuristics that recall the attempt to write instructions to the code page (i.e., a same memory page that led to the first page fault exception) in response to the first capability violation. Accordingly, the heuristics may determine that an attempt to "execute after write" (i.e., an attempt to execute program instructions from a memory page that was previously written) has occurred, which may indicate a likelihood of presence of an exploit (or malware). That is, the instrumentation logic may apply the heuristics to detect an execute-after-write arising from two or more capability violations that indicates the likelihood of presence of an exploit (or malware), e.g., the threshold of confidence is exceeded. As such, a pattern (e.g., sequence) of capability violations may be used to determine whether the threshold of confidence (i.e., suspicion of an exploit) is exceeded indicating the statistical likelihood that the process contains an exploit (or malware).

II. Malware Detection Appliance Architecture

In one or more embodiments, the MDS appliance node (MDS) $200_M$ may be embodied as an intermediate node configured to analyze network traffic associated with one or more endpoints $200_E$ of a computer network, such as private network 130. The MDS $200_M$ may be illustratively positioned (e.g., as an ingress/egress point) within the private network 130 to intercept (i.e., snoop) the traffic. The intercepted traffic may be replayed (i.e., transmitted) to or its contents otherwise submitted to and, in any case, instrumented (i.e., monitored) at the MDS $200_M$.

Illustratively, the MDS appliance $200_M$ may include functionality directed to replaying of network traffic and using instrumentation of that traffic to monitor the processing of objects within the traffic. For every network packet received, the MDS appliance may run a heuristic to compute a flow, as appropriate, for the packet, and then create (spawn) a virtual machine (VM) to emulate the endpoint using an image of an operating system (guest operating system and, often, one or more applications) configured to replicate a software processing environment of the endpoint, e.g., based on a payload (object) of the packet to be replayed and instrumented. An object may include a logical entity such as, for example, a web page, an email or email attachment, an executable (i.e., binary or script), a file (which may contain an executable), or universal resource locator (URL). Information as to an appropriate processing environment may be provided by the packet itself, e.g., the packet header may identify the packet type, for example, a document such as a Portable Document Format (PDF) document and, thus, the processing environment may include a document reader, such as a PDF reader from Adobe Systems Inc. Additionally, or in alternative embodiments, information may also be provided by the endpoint (such as the destination endpoint as specified in the packet) to the MDS indicating a type of application software (process) executing within the operating system on the endpoint. The MDS may then launch a copy of the application along with appropriate instrumentation to process each object. For example, assume the MDS replays HTTPS traffic received at the endpoint which executes, inter alia, an application (i.e., a web browser). The MDS may capture the network (HTTPS) traffic destined to the endpoint, spawn the VM and launch a copy of the web browser along with instrumentation to monitor the traffic.

Figure 4:
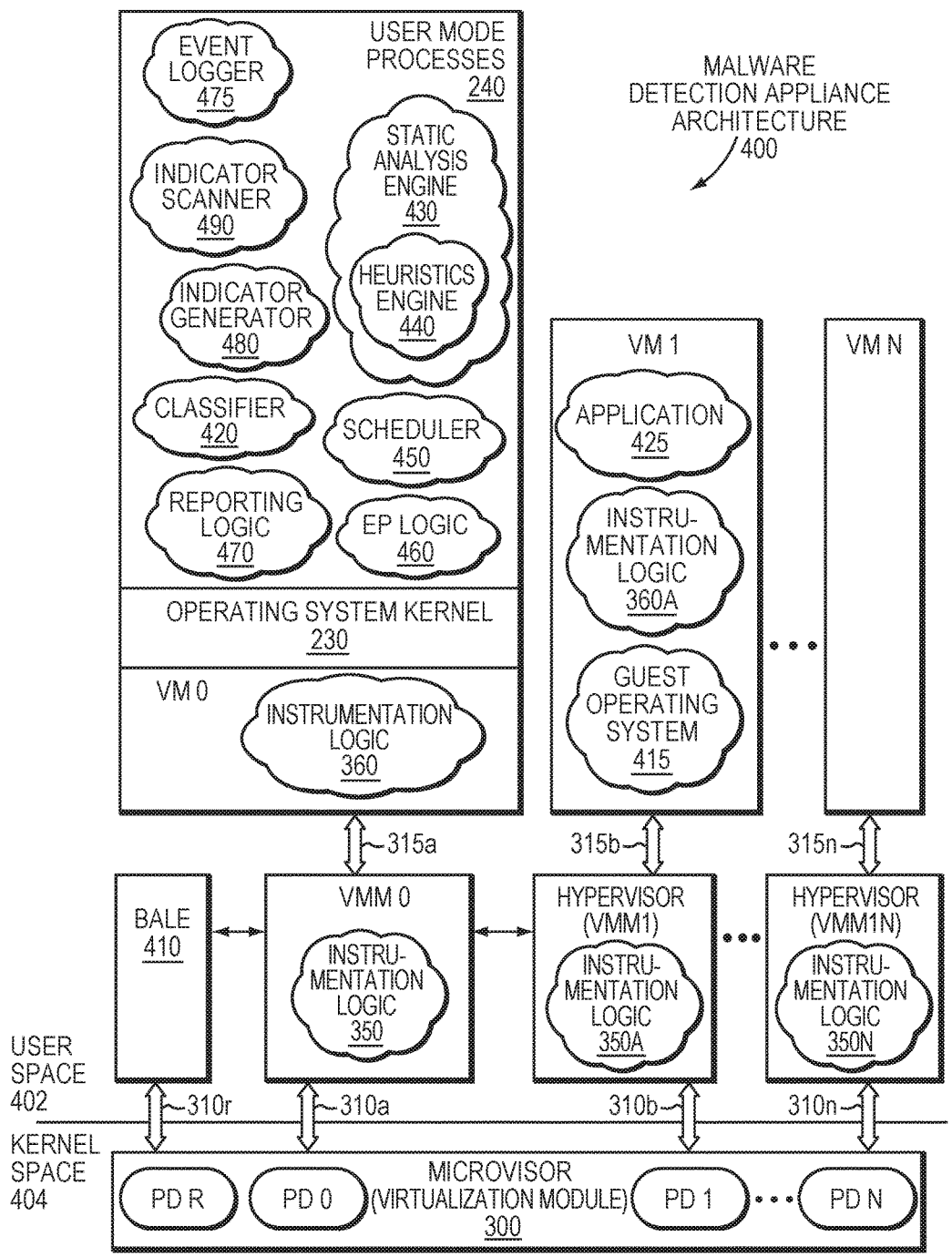
FIG. 4 is a block diagram of a malware detection appliance architecture that may be advantageously used with one or more embodiments described herein.

In an embodiment, the threat-aware microvisor 300 may be deployed in a virtualization architecture as a module of a virtualization system executing on the MDS $200_M$ to provide exploit and malware detection within the network environment 100. FIG. 4 is a block diagram of a malware detection appliance architecture 400 that may be advantageously used with one or more embodiments described herein. Illustratively, the architecture 400 may organize the memory 220 of the MDS appliance $200_M$ as a user space 402 and a kernel space 404. The microvisor may underlie the operating system kernel 230 and execute in the kernel space 404 of the architecture 400 to control access to the kernel resources of the MDS $200_M$ for any operating system process (kernel or user mode). Notably, the microvisor 300 executes at the highest privilege level of the hardware (CPU) to virtualize access to the kernel resources of the MDS appliance in a light-weight manner when, e.g., a user mode process 240 requests the services of the operating system kernel 230.

The user mode processes 240 and operating system kernel 230 may execute in the user space 402 of the appliance architecture 400, although it will be understood to those skilled in the art that the user mode processes may execute in another address space defined by the operating system kernel. Illustratively, the operating system kernel 230 may execute under control of the microvisor at a privilege level (i.e., a logical privilege level) lower than a highest privilege level of the microvisor, but at a higher CPU privilege level than that of the user mode processes 240. In addition, VMM 0 and VM 0 may execute in user space 402 of the architecture 400. As a type 0 virtual machine monitor, VMM 0 and VM 0 may execute at the highest (logical) privilege level of the microvisor. That is, VMM 0 and VM 0 may operate under control of the microvisor at the highest microvisor privilege level, but may not directly operate at the highest CPU (hardware) privilege level.

One or more hypervisors, e.g., type 1 VMM, may be disposed as one or more modules over the microvisor 300 and operate in user space 402 of the architecture 400 under control of the microvisor at the highest microvisor privilege level to provide additional layers of virtualization for the MDS $200_M$. Illustratively, each hypervisor provides full virtualization of kernel (hardware) resources and supports execution of one or more entire operating system instances (i.e., guest operating system) inside one or more full virtual machines. To that end, a hypervisor (e.g., VMM 1) may instantiate a full VM (e.g., VM 1) as a module provisioned with a software profile that includes a guest operating system (e.g., guest operating system 415) and any associated application programs (e.g., application 425), as well as instrumentation logic (e.g., instrumentation logic 360A) directed to determination of malware in any suspicious object or application running on the guest operating system. The software profile (e.g., guest operating system and/or application program) provisioned and configured in the VM may be different (e.g., in vendor, type and/or version) from the software profile provisioned and configured in other instantiated VMs (e.g., VM N).

Illustratively, each hypervisor (e.g., VMM $1\text{-}1_N$) may contain computer executable instructions executed by the CPU 212 to perform operations that initialize and configure the instrumentation logic (e.g., instrumentation logic 350A-N), as well as operations that spawn, configure, and control/implement the VM (e.g., VM 1-N) and its instrumentation logic (e.g., 360A). In an embodiment, there is illustratively one hypervisor (e.g., VMM $1\text{-}1_N$) for each VM (e.g., VMs 1-N), wherein each VM may be used to emulate an endpoint. The MDS $200_M$ may not emulate every endpoint on, e.g., a segment, but when a malicious object (such as, e.g., a file of a network packet) is identified, the VMM 1 of the MDS appliance may create (spawn) a full VM 1 to analyze that object. The virtualization layers of the MDS $200_M$ may cooperate to implement an abstraction of virtual devices exposed as, e.g., virtual network interfaces to the VMs.

Illustratively, the instrumentation logic 350 of VMM 0 may include monitoring logic configured to monitor and collect behaviors detected during processing of a suspicious object or application, wherein the behaviors may or may not constitute capability violations (e.g., generated by CPU 212 in response to one or more interception points). A system call illustratively provides an interception point at which a change in privilege levels occurs in the operating system, i.e., from a privilege level of the user mode process to a privilege level of the operating system kernel. VMM 0 may intercept the system call and examine a state of the process issuing (sending) the call. The instrumentation logic 350 of VMM 0 may analyze the system call to determine whether the call is suspicious and, if so, cooperate with VMM 1 to instantiate (spawn) one or more virtual machines (e.g., VM 1) equipped with monitoring functions, e.g., of instrumentation logic 360A, that cooperate with the microvisor to detect anomalous behavior which may be used in determining malware.

Inference of malware may also be realized through sequences of interception points wherein, for example, a system call followed by another system call having certain parameters may lead to an inference that the application (process) sending the calls is malware. The interception point thus provides an opportunity for VMM 0 to perform "light-weight" analysis to evaluate a state of the process in order to detect possible malware without requiring any policy enforcement. VMM 0 may then cooperate with VMM 1 to spawn a full VM 1 and configure the capabilities of its protection domain to enable deeper monitoring and analysis (e.g., through interception points and capability violations) that, in combination with malware detection processing, enable detection of expected (or unexpected) behaviors of the process that may be indicative of malware. Notably, the analysis may also classify the process as a type of exploit (e.g., a stack overflow) or as malware and may even identify the same. As a result, the invocation of instrumentation and monitoring logic of VMM 0, VMM 1 and their spawned VMs in response to interception points originated by operating system processes and capability violations generated by the microvisor advantageously enhance the virtualization system described herein to provide an exploit and malware detection system configured for run-time security analysis of the operating system processes executing on the MDS $200_M$.

In an embodiment, the privileged interfaces 310 and 315 may be embodied as a set of defined hyper-calls, which are illustratively inter process communication (IPC) messages exposed (available) to VMM 0, VMM 1-1$_N$ (including spawned VMs) and any other isolated software program code (module). The hyper-calls are generally originated by VMM 0 and VMM 1-1$_N$, directed to the microvisor 300 over privileged interface 310a-n, although VM 0 and VM 1-N may also originate one or more hyper-calls (IPC messages) directed to the microvisor over privileged interface 315a-n. However, the hyper-calls originated by VM 0 and VM 1-N may be more restricted than those originated by VMM 0 and VMM 1-1$_N$.

In an embodiment, the microvisor 300 may be organized to include a plurality of protection domains (e.g., PD 0-R) illustratively bound to VM 0, one or more VMs, and any isolated module, respectively. For example, the spawned VM (e.g., VM 1) is illustratively associated with (bound to) a copy of PD 0 (e.g., PD 1), wherein such binding may occur through memory context switching. In response to a decision to spawn the VM 1, VMM 1 may issue a hyper-call over interface 310b to the microvisor requesting creation of the protection domain PD 1. Upon receiving the hyper-call, the microvisor 300 may copy (i.e., "clone") the data structures (e.g., execution contexts, scheduling contexts and capabilities) of PD 0 to create PD 1 for the VM 1, wherein PD 1 has essentially the same structure as PD 0 except for the capabilities associated with the kernel resources. The capabilities for PD 1 may limit or restrict access to one or more of the kernel resources as instructed through one or more hyper-calls from, e.g., VMM 1 and/or VM 1 over interface 310b to the microvisor. Such cloning of the PD 0 data structures may also be performed to create other PDs, such as PD N for VM N as well as PD R for the isolated module disposed over the microvisor. Accordingly, the microvisor 300 may contain computer executable instructions executed by the CPU 212 to perform operations that initialize, clone and configure the protection domains.

Advantageously, the microvisor 300 may be organized as separate protection domain containers for the operating system kernel 230 (PD 0), one or more application programs/processes running in one or more operating system images (PD 1-N) and any isolated module (PD R) to facilitate further monitoring and/or understanding of behaviors of a process/object and its threads through, inter alia, the use of interception points and capability violations as described herein. Such organization of the microvisor also enforces separation between the protection domains to control the activity of the monitored process. Moreover, the microvisor 300 may enforce access to the kernel resources through the use of variously configured capabilities of the separate protection domains. Unlike previous virtualization systems, separation of the protection domains to control access to kernel resources at a process granularity enables detection of anomalous behavior of malware. That is, in addition to enforcing access to kernel resources, the microvisor enables analysis of the operation of a process/object within a spawned VM to detect exploits or other malicious code threats that may constitute malware.

III. Malware Detection

Exploit and malware detection on the appliance may be performed in accordance with one or more processes embodied as software modules or engines containing computer executable instructions executed by the CPU to detect suspicious and/or malicious behaviors of an operating system process (including an application program) when, e.g., executing contents of an object, and to correlate and classify the detected behaviors as indicative of malware (i.e., a matter of probability). It should be noted that the MDS appliance may perform (implement) exploit and malware detection as its primary processing (i.e., majority use of appliance resources) whereas, e.g., the endpoint may implement such detection as background processing (i.e., minor use of endpoint resources) with data processing being implemented as its primary processing (e.g., in the foreground having majority use of endpoint resources).

Detection of a suspicious and/or malicious object may be performed at the appliance in accordance with a sequential two-phase analysis approach, e.g., static analysis followed by dynamic analysis, of the object. As noted, an object may include a web page, email, email attachment, an executable (i.e., binary or script), a file (which may contain an executable or document), or a URL. Static analysis may perform examination of the object to determine whether it is suspicious and, if so, the suspicious object may be subjected to dynamic analysis, which may instrument the behavior of the object as it executes (runs) in guest operating system 415 to identify anomalous behavior and capability violations of, e.g. operating system events. A behavioral analysis logic engine (BALE) 410 and a classifier 420 may thereafter cooperate to perform correlation and classification of the detected behaviors as malicious or not. That is, the BALE 410 and classifier 420 may cooperate to analyze and classify detected behaviors of the object (based on the events) as indicative of malware.

Illustratively, static analysis may be provided as a precursor to dynamic analysis (i.e., a sequential two-phase approach) such that the static analysis phase may filter objects so that only suspect objects are provided to the dynamic analysis phase and/or may determine the order of processing (priority) of objects during the dynamic analysis, depending on the embodiment. In an embodiment, the static analysis phase may include a static analysis engine 430 having a heuristics engine 440 executing as one or more user mode processes of the operating system kernel 230. The static analysis engine 430 and heuristics engine 440 may employ statistical analysis techniques, including the use of heuristics, to perform non-behavioral analysis in order to detect anomalous characteristics (i.e., suspiciousness and/or malware) without execution (i.e., monitoring run-time behavior) of the object. For example, the static analysis engine 430 may employ signatures (referred to as malware "indicators") to match content (e.g., bit patterns) of the object with patterns of known indicators of known malware in order to gather information that may indicate that the object is suspicious or malicious. The statistical analysis techniques may produce static analysis results that include, e.g., identification of communication protocol anomalies and/or suspect source addresses for packets of known malicious servers.

As used herein, static analysis (e.g., as performed by the static analysis engine 430) denotes examination or testing of content of an object and observation of patterns within the content (e.g., bit patterns) to generate a score based on the results. The score may be a probability value (expressed in any of various ways such as, for example, a numerical value or percent) or other indicator (quantitative or qualitative) of security risk. A software program may be employed to examine chunks of bytes within an object (file) and compare those chunks with entries of a suspicious object database having chunks of objects deemed suspicious or malicious. If the chunks match, the score may be generally indicative of suspiciousness of the object. Static analysis may further involve comparison of the object's content (e.g., bit patterns) with a "blacklist" of suspicious malware indicator patterns before any behavioral analysis is performed. For example, a simple indicator check (e.g., hash) against the hashes of the blacklist (i.e., malware indicators of objects deemed suspicious) may reveal a match and a score may be generated (based on the content) that may be generally indicative of suspiciousness of the object.

An object with an associated score (value) above a first threshold may indicate a suspicious object, i.e., an object with a certain probability of being malicious, and above a second, higher threshold may indicate that object should be classified as malware, i.e., an object with a high probability of being malicious. The MDS may classify the object as malware in response to the score, and may or may not bypass the dynamic analysis as a result. If the MDS classifies the object as malicious based on a static analysis results score, this may be signaled to a network or security administrator for action by an appropriate alert. Additionally, the malicious object may be submitted for dynamic analysis for acquisition of additional, forensic information.

In an embodiment, the heuristics engine 440 may be configured to apply rules and/or policies used to detect anomalous characteristics of the object, such as one or more packets of network traffic, and to identify whether the object is suspect and deserving of further analysis or whether it is non-suspect (i.e., benign) and not in need of further analysis. To that end, the heuristic engine 440 may run one or more heuristics to provide (heuristic) analysis using, e.g., rules or weighting methods to determine whether the object (packet) is suspicious. In response to a suspicious determination or during static analysis (depending on the embodiment), the static analysis engine 430 may analyze the object, e.g., an attached or embedded object (e.g., a file) of one or more packets of the suspicious traffic, to, inter alia, determine its type and identify software profile information associated with an operating system instance (i.e., guest operating system 415) of a run-time environment for execution in a VM. The static analysis engine 430 may then provide the software profile information to another user mode process embodied as scheduler 450, which may coordinate with VMM 1 (e.g., via VMM 0) to spawn and schedule VM (e.g., VM 1) to replay the traffic (and analyze the object) in accordance with the dynamic analysis stage.

In an embodiment, the scheduler 450 is responsible for scheduling dynamic analysis of objects following static analysis. The scheduler may schedule the objects in accordance with an order (i.e., priority) based on the static analysis score for the objects. Where the static analysis engine 430 determines a score above a prescribed threshold indicating a high probability the corresponding object is malicious, the object may be scheduled for dynamic analysis ahead of other objects associated with lower static analysis scores even if those other objects were received earlier than the object in question. Where the object is determined to be part of a flow (namely a group of related messages) that is part of ingress data traffic typically communicated between two electronic devices during a single communication session (e.g., Transport Control Protocol "TCP" session), the scheduler 450 may schedule the dynamic analysis after receipt (i.e., buffering) of the entire flow.

In one or more embodiments, the static analysis engine 430 may be configured to analyze content of the packet (e.g., source and/or destination address of a network header) to determine its source and/or destination (i.e., web site and/or endpoint). The static analysis engine 430 may then cooperate with another module, e.g., endpoint (EP) logic 460, executing as a user mode process of the operating system kernel 230 and configured to communicate with a corresponding endpoint 200$_E$. In an embodiment, the MDS appliance may be configured to communicate with and instruct the endpoint to, e.g., perform an action and receive notification of that action. For example, the MDS appliance may communicate with the endpoint to obtain the latest software being run at the endpoint, or to access a database of all software images maintained on a per endpoint basis. The MDS may then configure the run-time environment for dynamic analysis on instantiation of the VM with the same operating system and at least one of the same applications, or a "nearly similar" operating system and application that is available to the appliance, e.g., stored in the appliance. If the same operating system and applications, e.g., in terms of vendor, type and version, are employed, then malware detection may find malware (e.g., contained in the object) including exploits that attack vulnerabilities in the software.

In other embodiments, communication with a corresponding endpoint can be avoided while still practicing other aspects of the disclosure. In such embodiments, the software profile used to configure the VM may simply be an available profile suitable to process the object. For example, where the object is determined to be a Microsoft WORD® document, the VM may be provisioned with a version of that software, and where the object is an executable, a process (e.g., script) may be used to launch the executable within the virtual run-time environment.

Dynamic analysis may include exploit and malware detection performed by, e.g., the microvisor 300, VMM 1 and VM 1 to detect behaviors of the object. Illustratively, VMM 1 may configure VM 1 with a software profile that replicates (mimics) a proper run-time environment to process the object and/or that the object expects, e.g., if the object content is a web page or PDF file, the VM may be configured with a suitable application program 425, such as a browser or Adobe reader application, respectively. The behaviors of the object may then be detected by instrumenting (i.e., monitoring) the object (using, e.g., instrumentation logic 360A) as the object executes in the guest operating system 415 at VM 1, wherein the monitored run-time behaviors may be captured by the microvisor 300 and VMM 1, and provided to the BALE 410 as dynamic analysis results. In an embodiment, multiple objects may be processed concurrently (overlapping) in the VMs, while in other embodiments, multiple run-time environments may be concurrently or sequentially run to analyze the same object in a single or separate VMs. The VMM 1 may configure the instrumentation logic 360A to monitor different types of objects, such as payloads of network (web) and email packets, although alternatively, there could be separate web-based and email-based MDS appliances, each of which may be deployed in generally the same way and configured to perform detection as generally described herein. For example, the email-based MDS appliance may be deployed in the private network to examine and process attachments using different types of heuristics. The suspicious object may be analyzed to arrive at a malware/non-malware classification based on detected anomalous behaviors during processing of the object (e.g., capability violations captured by VMM 1 and VM 1).

Illustratively, monitors may be employed during the dynamic analysis to monitor the run-time behaviors of the object and capture any resulting activity. The monitors may be embodied as capability violations configured to trace particular operating system events. For example during instrumenting of the object at the VM 1, the system events may trigger capability violations (e.g., exceptions or traps) generated by the microvisor 300 to enable monitoring of the object's behaviors during run-time. In an embodiment, the monitors may be further configured to detect behaviors that appear benign, but when analyzed collectively with other behaviors, may be indicative of malware. The monitors may include breakpoints within code of the process executing the object being monitored. The breakpoints may be configured to trigger capability violations or other processing used to gather or monitor the run-time behaviors. For instance, a breakpoint may be inserted into a section of code of the process (e.g., application 425) running in the guest operating system 415. When the code executes, e.g., in response to the application 425 accessing the object, an interception point may be triggered and a capability violation generated to enable monitoring of the executed code. In other words, an exception may be generated on the breakpoint and execution of the code by the application may be tracked by the microvisor 300 and VMM 1, where the exception is a capability violation.

The dynamic analysis results may be stored in memory 220 (e.g., in event logger 475) and provided (e.g., as input via VMM 0) to the BALE 410, which may provide correlation information (e.g., as an output via VMM 0) to the classifier 420; however, in an embodiment, the BALE may be configured to operate on both static and dynamic analysis results to generate correlation information for the classifier. The BALE 410 may be embodied as a rules-based correlation engine illustratively executing as an isolated process (module) disposed over the microvisor 300 within the architecture 400. In accordance with the malware detection appliance architecture 400, the BALE 410 is illustratively associated with (bound to) a copy of PD 0 (e.g., PD R). The microvisor 300 may copy (i.e., "clone") the data structures (e.g., execution contexts, scheduling contexts and capabilities) of PD 0 to create PD R for the BALE 410, wherein PD R has essentially the same structure as PD 0 except for the capabilities associated with the kernel resources. The capabilities for PD R may limit or restrict access to one or more of the kernel resources as requested through one or more hyper-calls from, e.g., BALE 410 over interface 310r to the microvisor.

In an embodiment, the BALE 410 may be configured to operate on correlation rules that define, among other things, patterns (such as, e.g., sequences) of known malicious behaviors (if-then statements with respect to, e.g., attempts by a process/object to change memory in a certain way that is known to be malicious) that may collectively correlate to malicious events (activity). In some embodiments, the correlation rules may define patterns of known benign behaviors that may collectively correlate to benign (non-malicious) events. The dynamic analysis may collect the monitored behaviors and cooperate with the BALE to examine those behaviors, separately or collectively, as patterns to determine whether they represent malicious or benign events indicative of the presence of malware. For example, a behavior may be detected that appears benign, but when examined with other behaviors, may be indicative of malicious activity. In addition, the BALE may perform correlation of relationships to, e.g., render a determination of a weighted degree of similarity of matched objects based on experiential knowledge. As noted, a VM may be spawned to instrument a suspect process (object) running in a guest operating system and cooperate with the microvisor 300 and VMM 1 to generate capability violations in response to interception points, which capability violations are provided as dynamic analysis result inputs to the BALE 410. The rules of the BALE 410 may then be correlated against those dynamic analysis results to generate correlation information pertaining to, e.g., a level of risk or a numerical score used to arrive at a decision of (deduce) maliciousness.

The classifier 420 may be embodied as a classification engine executing as a user mode process of the operating system kernel 230 and configured to use the correlation information provided by BALE 410 to render a decision as to whether the object is malicious. Illustratively, the classifier 420 may be configured to classify the correlation information, including monitored behaviors (expected and unexpected/anomalous) and capability violations, of the object relative to those of known malware and benign content. That is, a determination of whether the monitored behaviors represent expected or unexpected (anomalous) behaviors is rendered by correlating the monitored behaviors against behaviors of known malware. Results of the static analysis may also be used in the correlation and classification, e.g., by being combined with the results of the dynamic analysis to yield a combined score. In an embodiment, further static analysis and/or dynamic analysis may be performed at the appliance based on the results of correlation and classification engines. For example, an analysis controller (not shown) may be configured to examine the results of the BALE and classifier and, in response, provide the object back to the static and/or dynamic analysis stages for further (static and/or behavioral) analysis.

Illustratively, the BALE 410 and classifier 420 may be implemented as separate modules as described herein although, in an alternative embodiment, the BALE 410 and classifier 420 may be implemented as a single module disposed over (i.e., running on top of) the microvisor 300. The BALE 410 may be configured to correlate observed behaviors (e.g., results of dynamic analysis) with known malware and/or benign objects (embodied as defined rules) and generate an output (e.g., a level of risk or a numerical score associated with an object) that is provided to and used by the classifier 420 to render a decision of malware based on the risk level or score exceeding a probability threshold. A reporting logic engine 470 may execute as a user mode process in the operating system kernel 230 that is configured to generate an alert for transmission external to the MDS $200_M$ (e.g., to one or more other endpoints $200_E$ or to a management appliance) in accordance with "post-solution" activity.

In an embodiment, the MDS $200_M$ may include one or more modules executing as user mode process(es) in the operating system kernel 230 and configured to create indicators (signatures) of detected behaviors of a process/object as indicative of malware and organize those indicators as reports for distribution to the endpoints. To that end, the MDS appliance may include an indicator generator 480 configured to generate the malware indicators for distribution to the endpoints $200_E$. Illustratively, the malware indicators may not be typical code indicators, e.g., anti-virus (AV) signatures; rather, the malware indicators may be embodied as one or more hashes of the object classified as malware, possibly including identification information regarding its characteristics and/or behaviors detected during static and dynamic analysis. The indicator generator 480 may be further configured to generate both malware indicators and typical AV signatures to thereby provide a more robust set of indicators/signatures. These indicators may be used internally by the MDS appliance or distributed externally as original indicator reports to the endpoints.

The original indicator reports may also be provided to an intermediate node 200i, such as a management appliance, within the private (customer) network 130, which may be configured to perform a management function to, e.g., distribute the reports to other appliances within the customer network, as well as to nodes within a malware detection services and equipment supplier network (e.g., supplier cloud infrastructure) for verification of the indicators and subsequent distribution to other MDS appliances and/or among other customer networks. Illustratively, the reports distributed by the management appliance may include the entire or portions of the original indicator reports provided by the MDS appliance, or may include new reports that are derived from the original reports. An indicator scanner 490 may be embodied as a user mode process and configured to obviate (prevent) processing of a suspect process/object based on the robust set of indicators in the report. For example, the indicator scanner 490 may perform indicator comparison and/or matching during static analysis while the suspect process/object is instrumented by the VM. In response to a match, the indicator scanner 490 may cooperate with the microvisor 300 to terminate execution of the process/object.

In one or more embodiments, the MDS appliance 200$_M$ may be equipped with capabilities to defeat countermeasures employed by known malware, e.g., where malware may detect that it (i.e., process/object) is running on the microvisor 300 (e.g., through exposure of environmental signatures that can be used to identify the microvisor). In accordance with the malware detection appliance architecture 400, such behavior may be used to qualify suspiciousness. For example if a suspect object attempts to "sleep," the microvisor 300 and VMM 1 may detect such sleeping activity and may be able to accelerate sleeping. A sleep system call (which may also be provided by a library) may be issued by an object executed by an application to request sleeping and a capability violation may be triggered based on the call (interception point) to determine, e.g., the length of time the object requests to sleep and whether the time may be accelerated. Here, a breakpoint may be inserted into, e.g., the object to accelerate the sleeping time, assuming there is an appropriate heuristic enabling such acceleration. It should be noted that it may not always be desirable to accelerate sleeping because e.g., a shortened sleeping time may, in an embodiment, sever communication mechanisms between applications/processes. However, if such sleeping is associated with a type of malware behavior, acceleration may be performed.

The object may implement measures to identify that it is running in a microvisor environment; accordingly, the MDS 200$_M$ may implement countermeasures to provide strong isolation of the object during execution. The object may then execute and manifest behaviors that are captured by the microvisor and VMM 1. In other words, the microvisor and VMM 1 may detect (as a suspicious fact) that the suspect object has detected the microvisor. The object may then be allowed to run (while hiding the suspicious fact) and its behaviors detected. The microvisor 300 and VMM 1 may record the activity, including the detected suspicious fact, as an event with another user mode process embodied as the event logger 475. In addition, the event may be provided to the correlation engine (BALE 410) and classification engine (classifier 420) for possible classification as malware.

Figure 5:
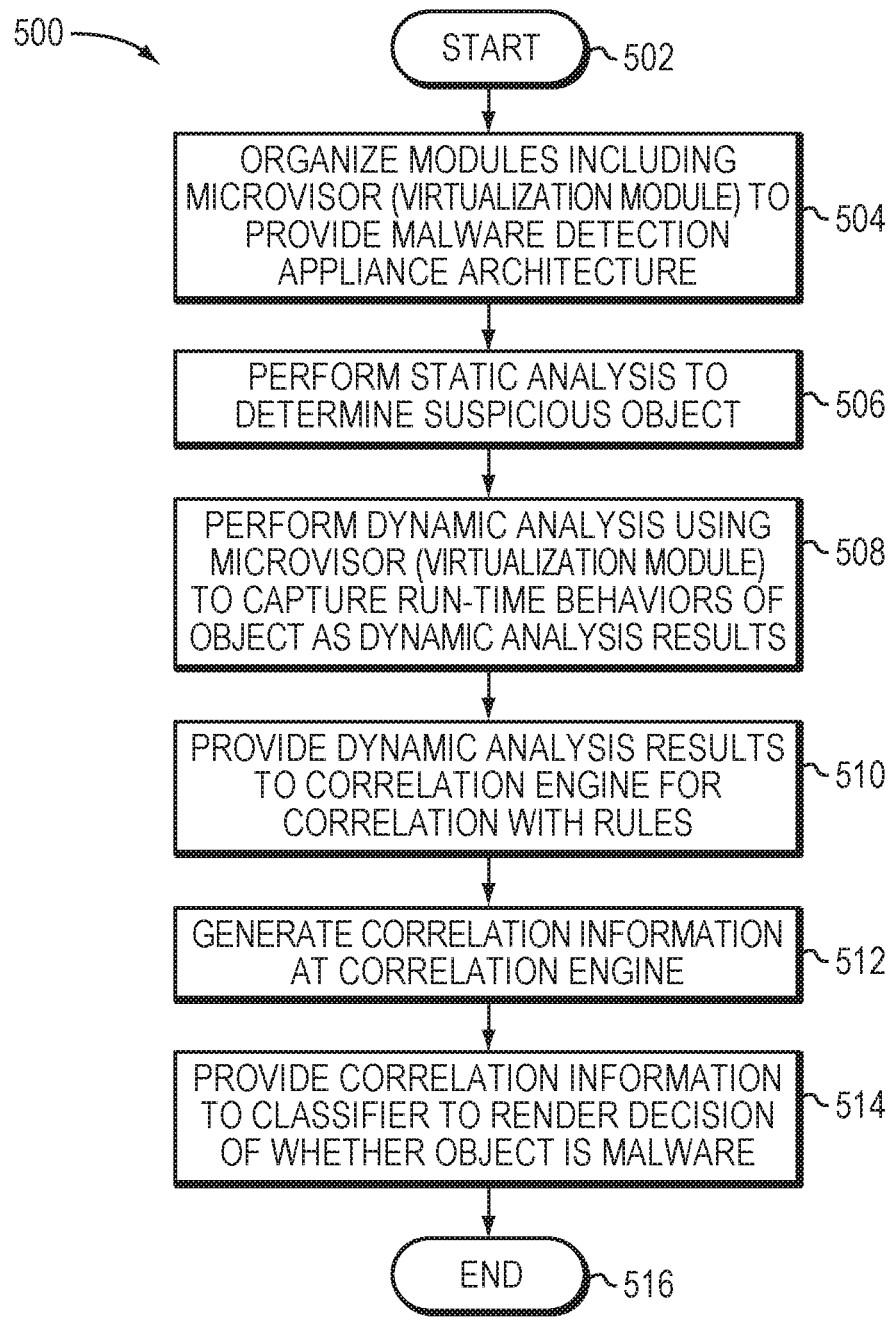
FIG. 5 is an example procedure for deploying the threat-aware microvisor in a malware detection appliance architecture.

FIG. 5 is an example procedure for deploying the threat-aware microvisor in a malware detection appliance architecture to provide exploit and malware detection on an object as it executes in a guest operating system on the appliance. The procedure 500 starts at step 502 and proceeds to step 504 where a plurality of software modules or engines, including the microvisor, as well as VMM 0, VMM 1 and VM 1, executing on the appliance are organized to provide the malware detection appliance architecture. At step 506, static analysis of the object may be performed by, e.g., a static analysis engine and a heuristics engine to determine a suspicious object. At step 508, dynamic analysis may be performed on the suspicious object by, e.g., the microvisor, VMM 1 and VM 1 to capture run-time behaviors of the object as dynamic analysis results. At step 510, the dynamic analysis results may be provided to a correlation engine (BALE) for correlation with correlation rules and, at step 512, the correlation engine may generate correlation information. At step 514, the correlation information may be provided to a classifier to render a decision of whether the object is malware. The procedure then ends at step 516.

IV. Trusted Computing Base (TCB)

In an embodiment, the microvisor 300 may be stored in memory as a module of a trusted computing base (TCB) that also includes a root task module (hereinafter "root task") configured to cooperate with the microvisor to create (i.e., load) one or more other modules executing on the CPU 212 of the MDS appliance 200$_M$. In addition, one or more of the malware detection system engines (modules) described herein may be included in the TCB to provide a trusted malware detection environment. For example, the BALE 410 may be loaded and included as a module in the TCB for the appliance 200$_M$.

Figure 6:
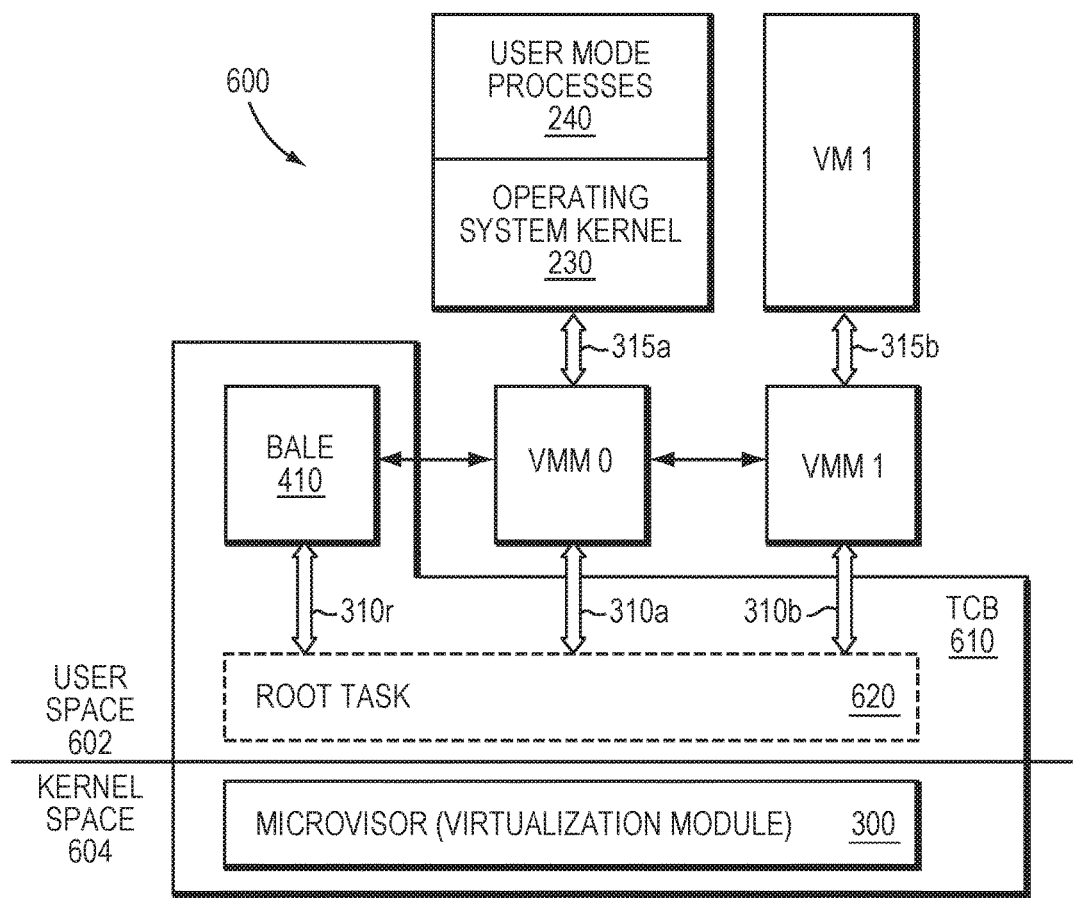
FIG. 6 is a block diagram of an exemplary virtualization architecture including a trusted computing base that may be configured to provide a trusted malware detection environment in accordance with one or more embodiments described herein.

FIG. 6 is a block diagram of an exemplary virtualization architecture 600 including a TCB 610 that may be configured to provide a trusted malware detection environment in accordance with one or more embodiments described herein. The microvisor 300 may be disposed as a relatively small code base that underlies the operating system kernel 230 and executes in kernel space 604 of the architecture 600 to control access to the kernel resources for any operating system process (kernel or user mode). As noted, the microvisor 300 executes at the highest privilege level of the hardware (CPU) to virtualize access to the kernel resources of the appliance in a light-weight manner. The root task 620 may be disposed as a relatively small code base that overlays the microvisor 300 (i.e., underlies VMM 0 and VMM 1) and executes in user space 602 of the architecture 600. Through cooperation (e.g., communication) with the microvisor, the root task 620 may also initialize (i.e., initially configure) the loaded modules executing in the user space 602. For example, the root task 620 may initially configure and load the BALE 410 as a module of the TCB 610.

In an embodiment, the root task 620 may execute at the highest (absolute) privilege level of the microvisor. Illustratively, the root task 620 may communicate with the microvisor 300 to allocate the kernel resources to the loaded user space modules. In this context, allocation of the kernel resources may include creation of, e.g., maximal capabilities that specify an extent to which each module (such as, e.g., VMM 0, VMM 1 and/or BALE 410) may access its allocated resource(s). For example, the root task 620 may communicate with the microvisor 300 through instructions to allocate memory and/or CPU resource(s) to VMM 0, VMM 1 and BALE 410, and to create capabilities that specify maximal permissions allocated to VMM 0, VMM 1 and BALE 410 when attempting to access (use) the resource(s). Such instructions may be provided over a privileged interface embodied as one or more hyper-calls. Notably, the root task 620 is the only (software or hardware) entity that can instruct the microvisor with respect to initial configuration of such resources.

In an embodiment, the root task 620 may be implemented as a "non-long lived" process that terminates after creation and initial configuration of the user space processes (modules). The non-long lived nature of the root task is depicted by dash lining of the root task 620 in FIG. 6. Illustratively, the root task 620 is the first user space process to boot (appear) during power-up and initialization of the appliance, including loading and initial configuration of the user space modules and their associated capabilities; the root task then terminates (disappears). The root task 620 may thereafter be re-instantiated (reappear) during a reboot process, which may be invoked in response to an administrative task, e.g., update of VMM 0. Notably, the root task 620 may only appear and operate on the appliance in response to a (re)boot process, thereby enhancing security of the TCB 610 by restricting the ability to (re)initialize the microvisor 300 after deployment on the MDS appliance 200$_M$.

As a trusted module of the TCB, the microvisor 300 is illustratively configured to enforce a security policy of the TCB that, e.g., prevents (obviates) alteration or corruption of a state related to security of the microvisor by a module (e.g., software entity) of or external to an environment in which the microvisor 300 operates, i.e., the TCB 610. For example, an exemplary security policy may provide, "modules of the TCB shall be immutable," which may be implemented as a security property of the microvisor, an example of which is no module of the TCB modifies a state related to security of the microvisor without authorization. In an embodiment, the security policy of the TCB 610 may be implemented by a plurality of security properties of the microvisor 300. That is, the exemplary security policy may be also implemented (i.e., enforced) by another security property of the microvisor, another example of which is no module external to the TCB modifies a state related to security of the microvisor without authorization. As such, one or more security properties of the microvisor may operate concurrently to enforce the security policy of the TCB. An example trusted threat-aware microvisor is described in U.S. patent application Ser. No. 14/602,023 titled Trusted Threat-Aware Microvisor by Ismael et al., having a priority date of Jul. 1, 2014.

Illustratively, the microvisor 300 may manifest (i.e., demonstrate) the security property in a manner that enforces the security policy. Accordingly, verification of the microvisor to demonstrate the security property necessarily enforces the security policy, i.e., the microvisor 300 may be trusted by demonstrating the security property. Trusted (or trustedness) may therefore denote a predetermined level of confidence that the microvisor demonstrates the security property (i.e., the security property is a property of the microvisor). It should be noted that trustedness may be extended to other security properties of the microvisor, as appropriate. Furthermore, trustedness may denote a predetermined level of confidence that is appropriate for a particular use or deployment of the microvisor 300 (and TCB 610). The predetermined level of confidence, in turn, is based on an assurance (i.e., grounds) that the microvisor demonstrates the security property. Therefore, manifestation denotes a demonstrated implementation that assurance is provided regarding the implementation based on an evaluation assurance level, i.e., the more extensive the evaluation, the greater the assurance level. Evaluation assurance levels for security are well-known and described in *Common Criteria for Information Technology Security Evaluation Part 3: Security Assurance Components*, September 2012, Ver. 3.1 (CCMB-2012-09-003).

While there have been shown and described illustrative embodiments for deploying the threat-aware microvisor in a malware detection appliance architecture executing on an appliance to provide exploit and malware detection within a network environment, it is to be understood that various other adaptations and modifications may be made within the spirit and scope of the embodiments herein. For example, embodiments have been shown and described herein with relation to providing a trusted malware detection environment having a TCB 610 that includes the BALE 410 as well as the microvisor 300 and root task 620. However, the embodiments in their broader sense are not so limited, and may, in fact, allow organization of other modules associated with a decision of malware to be part of the TCB. For example, the BALE 410 and classifier 420 may be loaded and included as modules in the TCB 610 for the MDS appliance 200$_M$ to provide the trusted malware detection environment. Moreover, if the software code associated with the BALE and/or classifier is too large and complex to verify as trusted, those modules may still be configured and disposed to run over the microvisor for isolation purposes, i.e., to isolate any malware in the module(s) by preventing access (via hyper calls) to other module(s) of the malware detection environment.

In addition, embodiments have been shown and described herein with relation to dynamic analysis of one or more operating system processes or objects using various instantiations of instrumentation logic 350, 350A-N, 360, 360A. For example, instrumentation logic 350 may be included in VMM 0 to examine a state of a process issuing an interception point (such as a system call) to determine whether the interception point is suspicious, whereas instrumentation logic 360A may be included in VM 1 to instrument (monitor) an object to detect its behaviors as the object executes in a guest operating system. The states and behaviors may be provided as dynamic analysis results to BALE, which may correlate the results against correlation rules to generate a risk level or numerical score used in a decision of maliciousness. However, the embodiments in their broader sense are not so limited and may allow for a subset of the instrumentation logic situated within (or outside of) VMs and VMMs, yet still configured to provide examination of interception points and monitoring of behaviors, including application of heuristics, as well as interaction with the BALE as described herein.

The foregoing description has been directed to specific embodiments. It will be apparent, however, that other variations and modifications may be made to the described embodiments, with the attainment of some or all of their advantages. For instance, it is expressly contemplated that the components and/or elements described herein can be implemented as software encoded on a tangible (non-transitory) computer-readable medium (e.g., disks, electronic memory, and/or CDs) having program instructions executing on a computer, hardware, firmware, or a combination thereof. Moreover, the embodiments or aspects thereof can be implemented in hardware, firmware, software, or a combination thereof. In the foregoing description, for example, in certain situations, terms such as "engine," "component" and "logic" are representative of hardware, firmware and/or software that is configured to perform one or more functions. As hardware, engine (or component/logic) may include circuitry having data processing or storage functionality. Examples of such circuitry may include, but is not limited or restricted to a microprocessor, one or more processor cores, a programmable gate array, a microcontroller, an application specific integrated circuit, semiconductor memory, or combinatorial logic. Accordingly this description is to be taken only by way of example and not to otherwise limit the scope of the embodiments herein. Therefore, it is the object of the appended claims to cover all such variations and modifications as come within the true spirit and scope of the embodiments herein.

What is claimed is:

1. A system comprising:
a microvisor configured to control access to a kernel resource of the system by generating a capability violation in response to an object running in a guest operating system attempting to access the kernel resource;
a type 0 virtual machine monitor (VMM 0) disposed over the microvisor and configured to expose the kernel resource to an operating system kernel of the system; and
a type 1 virtual machine monitor (VMM 1) further disposed over the microvisor and configured to operate under control of the microvisor to instrument the object as the object runs in the guest operating system,
wherein the VMM 1 and VMM 0 being configured to cooperate with the microvisor to capture run-time behaviors of the object as dynamic analysis results in response to the capability violation to detect whether the behaviors are indicative of malware.

2. The system of claim 1 wherein the microvisor comprises a main protection domain including one or more execution contexts and capabilities defining permissions for the object to access the kernel resource of the system.

3. The system of claim 2 wherein the VMM 1 is further configured to create a virtual machine to contain the guest operating system, the virtual machine bound to a clone of the main protection domain representative of the guest operating system.

4. The system of claim 3 wherein the clone of the main protection domain is created by copying the execution contexts and capabilities of the main protection domain, wherein the capabilities of the clone of the main protection domain are more restricted than the capabilities of the main protection domain with respect to access to the kernel resource.

5. The system of claim 1 further comprising a behavioral analysis logic engine configured to correlate the dynamic analysis results against correlation rules to generate correlation information pertaining to a level of risk used to arrive at a decision of maliciousness.

6. The system of claim 5 further comprising a classifier configured to use the correlation information to render a decision as to whether the object is malicious, the classifier further configured to classify the correlation information, including the behaviors and the capability violation, of the object relative to known malware.

7. The system of claim 1, wherein the microvisor is configured to communicate with the operating system kernel and perform a subset of hypervisor functionality including initiating one or more hyper-calls to implement a virtual machine monitor.

8. The system of claim 1, wherein the virtual machine monitor corresponds to VMM 1.

9. The system of claim 1, wherein the microvisor executes in a kernel space of the system to control access to the kernel resources.

10. The system of claim 9 being a virtualization architecture including a trusted computing base (TCB) that is configured to provide a trusted malware detection environment, the TCB includes at least the microvisor.

11. The system of claim 10, wherein the microvisor being configured to enforce a security policy for the TCB.

12. The system of claim 11 further comprising a behavioral analysis logic engine deployed as part of the TCB, the behavioral analysis logic engine to correlate the dynamic analysis results against correlation rules to generate correlation information pertaining to a level of risk used to arrive at a decision of maliciousness.

13. A system comprising:
one or more processing units;
one or more network interfaces;
one or more input/output (I/O) devices; and
a memory coupled to the one or more processing units, the memory comprises
a microvisor that, when executed by the one or more processing units, controls access to a kernel resource, being at least one of a collection of resources including any of the one or more processing units, the one or more network interfaces and the one or more I/O devices, by generating a capability violation in response to an object running in a guest operating system attempting to access the kernel resource;
a type 0 virtual machine monitor (VMM 0) that, when executed by the one or more processing units, exposes the kernel resource to an operating system kernel of the system; and
a type 1 virtual machine monitor (VMM 1) that, when executed by the one or more processing units, operates under control of the microvisor to instrument the object as the object runs in the guest operating system,
wherein the VMM 1 and VMM 0 being configured to cooperate with the microvisor to capture run-time behaviors of the object as dynamic analysis results in response to the capability violation to detect whether the behaviors are indicative of malware.

14. The system of claim 13 wherein the microvisor implemented within the memory and executed by the one or more processing units comprises a main protection domain including one or more execution contexts and capabilities defining permissions for the object to access the kernel resource of the system.

15. The system of claim 14 wherein the VMM 1 of the memory is further configured to create a virtual machine to contain the guest operating system, the virtual machine bound to a clone of the main protection domain representative of the guest operating system.

16. The system of claim 15 wherein the clone of the main protection domain is created by copying the execution contexts and capabilities of the main protection domain, wherein the capabilities of the clone of the main protection domain are more restricted than the capabilities of the main protection domain with respect to access to the kernel resource.

17. The system of claim 13, wherein the memory further comprises a behavioral analysis logic engine that, when executed by the one or more processing units, correlates the dynamic analysis results against correlation rules to generate correlation information pertaining to a level of risk used to arrive at a decision of maliciousness.

18. The system of claim 17, wherein the memory further comprises a classifier that, when executed by the one or more processing units, uses the correlation information to render a decision as to whether the object is malicious, the classifier further configured to classify the correlation information, including the behaviors and the capability violation, of the object relative to known malware.

* * * * *